(12) United States Patent
Makuta et al.

(10) Patent No.: US 7,621,629 B2
(45) Date of Patent: *Nov. 24, 2009

(54) INK JET RECORDING METHOD

(75) Inventors: Toshiyuki Makuta, Shizuoka-ken (JP); Masaaki Konno, Kanagawa (JP); Tetsuzo Kadomatsu, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 456 days.

This patent is subject to a terminal disclaimer.

(21) Appl. No.: 11/529,399

(22) Filed: Sep. 29, 2006

(65) Prior Publication Data

US 2007/0076070 A1    Apr. 5, 2007

(30) Foreign Application Priority Data

Sep. 30, 2005    (JP)    ............... 2005-289362

(51) Int. Cl.
*G01D 11/00*    (2006.01)

(52) U.S. Cl. ............... 347/100; 347/95; 523/160

(58) Field of Classification Search ............... 347/100, 347/95, 96, 101, 84, 85, 102; 106/31.6, 31.13, 106/31.27; 523/160
See application file for complete search history.

(56) References Cited

U.S. PATENT DOCUMENTS

| | | | |
|---|---|---|---|
| 4,245,029 A | | 1/1981 | Crivello |
| 2004/0244641 A1 | | 12/2004 | Takabayashi et al. |
| 2004/0259971 A1 | * | 12/2004 | Sasa ............... 522/170 |
| 2005/0287476 A1 | | 12/2005 | Ishkawa et al. |
| 2006/0055088 A1 | | 3/2006 | Nakayashiki et al. |
| 2006/0178449 A1 | | 8/2006 | Tsuchimura et al. |
| 2007/0076042 A1 | | 4/2007 | Makuta et al. |
| 2007/0229637 A1 | | 10/2007 | Makuta et al. |

FOREIGN PATENT DOCUMENTS

| | | | |
|---|---|---|---|
| EP | 1630213 A1 | | 3/2006 |
| EP | 1688467 A1 | | 8/2006 |
| EP | 1783184 A1 | | 5/2007 |
| JP | 63-60783 A | | 3/1988 |
| JP | 8-174997 A | | 7/1996 |
| JP | 8-218018 A | | 8/1996 |
| JP | 2000-135781 A | | 5/2000 |
| JP | 2000-135781 | * | 6/2000 |
| JP | 2001-348519 A | | 12/2001 |
| JP | 3478495 B2 | | 10/2003 |
| JP | 3642152 B2 | | 2/2005 |
| JP | 2005-96254 A | | 4/2005 |

* cited by examiner

*Primary Examiner*—Manish S Shah
(74) *Attorney, Agent, or Firm*—Sughrue Mion, PLLC

(57) ABSTRACT

An ink jet recording method for recording an image on a recording medium using a first liquid A for forming the image containing a polymerizable or crosslinkable material, and a second liquid B having a different composition from the composition of the first liquid A, the method including: applying the second liquid B, having a solubility parameter value of 35 or less and a difference of the solubility parameter value of 10 or less from the solubility parameter value of the first liquid A, onto the same area at which the image is to be formed by the first liquid A or a wider area than the area at which the image is to be formed by the first liquid A, of the recording medium which is impermeable or slowly-permeable; and jetting the first liquid A onto the recording medium where the second liquid B has been applied so that at least a droplet a1 and a droplet a2 of the first liquid A have an overlap portion.

18 Claims, No Drawings

INK JET RECORDING METHOD

CROSS REFERENCE TO RELATED APPLICATIONS

This application claims priority under 35USC 119 from Japanese Patent Application No.2005-289362, the disclosure of which is incorporated herein by reference.

BACKGROUND OF THE INVENTION

1. Field of the Invention

The present invention relates to an ink jet recording method, particularly to an ink jet recording method suitable for forming a high quality image at high speed by curing using a plurality of liquids.

2. Description of the Related Art

An ink jet system that ejects ink from an ink jetting port such as a nozzle is used in many printers for the reason that it is small-sized and inexpensive and it can form an image without contact between the ink jet system and a printing medium. Among these ink jet systems, a piezo ink jet system that utilizes the deformation of a piezo element to jet ink and a thermal ink jet system that utilizes a boiling phenomenon of ink which is caused by thermal energy have high resolution and high-speed printing ability.

Currently, it is important tasks to attain high-speed printing and high image quality when the ink is jetten on a plain paper or non-water absorbing recording media such as plastic.

In ink jet recording, ink (liquid) droplets are continuously ejected as droplet n1, droplet n2, droplet n3, . . . , and droplet nx, to form a line or an image composed of the droplet n1, droplet n2, droplet n3, . . . , and droplet nx on a recording medium. However, ink jet recording has some practical problems; if drying of the jetted droplets takes a long time, the formed image tends to blur, and the adjacent ink droplets n1 and n2 may be mixed to hinder the formation of a sharp image. Furthermore, when a non-water absorbing recording medium is used, drying of ink solvents is so slow that the recorded sheets cannot be stacked immediately after printing until the solvents dry. If droplets are mixed, adjacently jetted droplets may coalesce to migrate from the point of deposition. This causes uneven line width in forming a thin line, and color unevenness in forming a colored surface.

One of the method for preventing printing problems such as image blurring and uneven line width is the acceleration of ink curing. For example, a technique of curing and fixing of ink not by evaporating the ink solvent but by irradiation has been supposed. More specifically, a two-liquid type ink, which achieves both the storage stability and rapid drying property of an image, is used, and the two liquids react with each other on a recording medium. For example, a method of jetting an ink containing an anionic dye after applying a liquid containing a basic polymer as described in Japanese Patent Application Laid-Open (JP-A) No. 63-60783, a method of applying an ink containing an anionic compound and a coloring material after applying a liquid composition containing a cationic substance as described in JP-A No. 8-174997, and a recording method using an ink containing a light-curable resin and a photopolymerization initiator as described in U.S. Pat. No. 3,478,495 are disclosed.

Although these methods can prevent image blurring to some degree, they are not sufficient for preventing uneven line width, color unevenness or other problems caused by mixing of ink droplets. Furthermore, aqueous solvents used in these methods dry slowly, and jetted dyes tend to be unevenly distributed, and then the image quality may deteriorate.

As a technique with regard to the above-described problems, a method of curing and fixing an ink, which contains a pigment as the coloring component, by irradiation is described in JP-A No. 8-218018. In the method, a pixel is formed using either an ink containing a solidifying monomer or an ink containing a pigment dispersion, subsequently another pixel is formed using the remaining ink at the same point with the above-described image, and the inks are cured with ultraviolet light, electron beam or the like.

Furthermore, in a method as described in JP-A No. 2001-348519, an ink composition containing water, a reactive monomer, a colorant, and other components and an aggregating solution containing a coagulant causing coagulation are used, wherein the above-described coagulating solution is applied to a recording medium, and thereon the above-described ink composition is applied. Furthermore, a method of applying an ink composition containing a monomer after applying a reaction liquid containing a photopolymerization initiator all over the surface, and curing by ultraviolet radiation is described in U.S. Pat. No. 3,642,152.

In addition to the above-described methods, a method of overlappedly jetting two separate inks is described in JP-A No. 2000-135781.

SUMMARY OF THE INVENTION

The first embodiment of the present invention is an ink jet recording method for recording an image on a recording medium using a first liquid A for forming the image containing a polymerizable or crosslinkable material, and a second liquid B having a different composition from the composition of the first liquid A, the method comprising:

applying the second liquid B, having a solubility parameter value of 35 or less and a difference of the solubility parameter value of 10 or less from the solubility parameter value of the first liquid A, onto the same area at which the image is to be formed by the first liquid A or a wider area than the area at which the image is to be formed by the first liquid A, of the recording medium which is impermeable or slowly-permeable; and jetting the first liquid A onto the recording medium where the second liquid B has been applied so that at least a droplet a1 and a droplet a2 of the first liquid A have an overlap portion.

DETAILED DESCRIPTION OF THE INVENTION

The ink jet recording method of the present invention forms a desired image by ejecting the first droplet a1, droplet a2, . . . , and droplet ax, which are derived from the first liquid A, from an ink ejecting port (head) of an ink jet printer to an impermeable or slowly-permeable recording medium. In order to form a desired image, the first liquid A comprises at least a polymerizable or crosslinkable material, and in order to achieve a high image density, the first droplet a1 and droplet a2 are jetted in such a manner they are overlapped each other. Before applying the above-described droplet a1 and droplet a2, the second liquid B having a composition different from that of the above-described liquid A is applied to the same area with or a wider area than the above-described desired image area onto the above-described recording medium. The above-described liquid B has a solubility parameter value of 35 or less, and the difference of the solubility parameter value between the above-described liquid A and liquid B is 10 or less. Herein, the solubility parameter value refers to "sp value".

In the ink jet recording method of the present invention, an impermeable or slowly-permeable recording medium is used as the recording medium. In image recording on such a recording medium with low liquid absorbency, if adjacent droplets (the first droplet a1 and droplet a2), which had been overlappedly applied to achieve a high image density, are in contact each other on the medium before drying, they tend to coalesce each other to cause image blurring or uneven line width of a thin line, resultingly the formability of a sharp image can be impaired. However, when the liquid B having the specified sp value is jetted before jetting the first droplet a1 and droplet a2, coalescence of the overlappedly applied droplet a1 and droplet a2 is inhibited, and problems such as image blurring and uneven line width of a thin line in an image are effectively prevented. Accordingly, a sharp line having a uniform width can be formed with keeping an image resolution of high image density, thereby a high quality image can be recorded. Furthermore, the image has low stickiness and excellent rubbing resistance.

The impermeable recording medium refers to a medium which is substantially impermeable to droplets. "Substantially impermeable" means that the permeation rate measured one minutes after ink deposition is 5% or less. The slowly-permeable recording medium refers to a medium on which the complete permeation of 10 pl (picoliter) of droplets takes 100 mseconds or more, and specific examples thereof include art paper. The detail of the impermeable or slowly-permeable recording medium will be described later.

Permeable recording medium refers to a medium on which the complete permeation of 10 pl of droplets takes 100 m seconds or less, and specific examples thereof include plain paper and porous paper.

The first droplet a1 is jetted onto the above-described recording medium, and then the subsequent first droplet a2 is jetted in such a manner it overlaps the above-described droplet a1. Before applying the first droplet a1 and droplet a2, the second liquid B having a composition different from that of the first liquid A is applied to the same area with or a wider area than the image area to be formed by the above-described droplet a1 and droplet a2 onto the recording medium.

In the present invention, as the liquids for forming an image, the first liquid A containing the first droplet a1 and droplet a2, and the second liquid B having a composition different from that of the first liquid A are used. The first droplet a1 and droplet a2 refer to the droplets among the droplets a1, a2, a3, . . . , and ax of a single first liquid A, which are ejected from an ink ejecting port and overlappedly jetted. The droplets may be simultaneously jetted droplets, or sequentially jetted preceding and subsequent droplets, and are preferably sequentially jetted preceding and subsequent droplets. The first liquid A and the second liquid B have different compositions.

In the present invention, the sp value of the second liquid B, which is applied before applying the first liquid A, is 35 or less, and the difference of the sp value between the first liquid A and the second liquid B is 10 or less.

When the sp value is 35 or less, the second liquid B has higher affinity to, for example as described later, the first liquid A (droplet a1, droplet a2, . . . ) containing a polymerizable or crosslinkable material. Accordingly, coalescence between the overlappedly applied first droplet a1 and droplet a2 is inhibited, thereby image blurring and uneven line width of a thin line in an image can be effectively prevented.

In the second liquid B, the above-described sp value is more preferably 30 or less, and most preferably 25 or less. The difference of the sp value between the first liquid A and the second liquid B is more preferably 5 or less.

Furthermore, when the difference of the sp value between the first liquid A and the second liquid B is within the above-described range, the liquids are readily soluble in each other. The contact area between the droplet a1 and droplet B is larger than that between the droplet a1 and droplet a2, thus the droplet a1 is more compatible with the second liquid B. Accordingly, for example, when the overlappedly applied droplet a1, droplet a2, . . . droplet ax contain colorants, color blurring or mixing between the droplet a1 and droplet a2, and uneven line width of a colored line image are effectively prevented.

The sp value is determined for various solvents and solutes, and shows the affinity between solvents or between a solvent and a solute. When two solvents are compatible each other, the sp value is calculated from the energy change at the time when a solute is dissolved in a solvent. The sp value used in the present invention has been calculated, specifically, using the sp value calculation program by R. L. Smith at Tohoku University. The calculation is carried out on the basis of a temperature of 25° C., wherein compounds containing no carbon atom are excluded, constitutional units such as polymer and polyethylene chains are treated as saturated repeating units having dangling bonds (e.g., styrene is —$CH_2$—$CH$ ($C_6H_5$)—), and water ($H_2O$) is calculated as 47.8.

In the ink jet recording method of the present invention, the aforementioned first droplet a1 and droplet a2 are jetted using an ink jet nozzle or the like. The second liquid B is applied not only by ejection using an ink jet nozzle, but also by other means such as application.

The means for applying the second liquid B to the recording medium is described. The means for jetting the first droplet a1 and droplet a2 (the first liquid A) is described mainly focusing on ejection the above described ink jet nozzle. Specific examples will be described.

(i) Application with coater

It is a preferable embodiment that the second liquid B is applied to a recording medium using a coater, subsequently the droplets a1 and a2 (the first liquid A) are jetted by an ink jet nozzle to record an image.

The coater is not particularly limited, and can be appropriately selected from known coaters according to the intended use. Examples of the coater include an air doctor coater, a blade coater, a rod coater, a knife coater, a squeeze coater, an impregnation coater, a reverse roll coater, a transfer roll coater, a gravure coater, a kiss-roll coater, a cast coater, a spray coater, a curtain coater, and an extrusion coater. Details of the method may be referenced in "Coating Kogaku (Coating Engineering)", by Yuji Harasaki.

The ink jet nozzle is not particularly limited, and can be appropriately selected from known nozzles according to the intended use. The ink jet recording method will be described later.

Furthermore, liquids other than the first droplet a1, droplet a2 (the first liquid A), and the second liquid B may be used. The other liquids may be applied to a recording medium by any methods such as the above-described coating using coaters or ejection using an ink jet nozzle. The timing of application is not particularly limited. Liquids containing a colorant is preferably injected using an ink jet nozzle, and preferably applied after applying the second liquid B.

(ii) Ejection ink with ink jet nozzle

It is a preferred embodiment to record an image by injecting the second liquid B as droplet b1, droplet b2, droplet b3, . . . , and droplet bx using an ink jet nozzle, followed by jetting the first droplet a1, droplet a2, droplet a3, . . . , and droplet ax (the first liquid A) using an ink jet nozzle. The ink jet nozzle is the same as described above.

Also in this instance, the liquids other than the first droplet a1, droplet a2 (the first liquid A), and the second liquid B may be applied to a recording medium by any methods such as coating using a coater or ejection using an ink jet nozzle, and the timing of application is not particularly limited. Liquids containing a colorant is preferably injected using an ink jet nozzle, and preferably applied after applying the second liquid B.

The methods for ejecting with an ink jet nozzle (ink jet recording methods) will be described below.

In the present invention, preferable examples include known methods such as a charge control method which uses electrostatic attraction to eject ink, a drop-on-demand method (pressure pulse method) which uses vibration pressure of a piezo element, an acoustic ink jet method in which an electric signal is transformed into an acoustic beam and ink is irradiated with the acoustic beam so as to be ejected by radiation pressure, and a thermal ink jet (bubble jet (Registered trademark)) method which uses pressure caused by bubbles formed by heating ink.

Examples of the ink jet recording method include a method which uses ink having low concentration called photo ink to eject a multitude of ink droplets having a small volume, a method which uses a plurality of inks having substantially the same color hue but different concentrations to improve image quality, and a method which uses colorless transparent ink.

In instances where the above-described application means (i) is used, at least the first droplet a1 and second droplet a2 are jetted by the ink jet recording method on the second liquid B which has been applied to the recording medium in advance, thereby an image is formed. In instances where the above-described application means (ii) is used, at least the first droplet a1 and the first droplet a2 are jetted by the ink jet recording method on the second liquid B which has been applied to the recording medium by the ink jet recording method in advance, thereby an image is formed.

In the present invention, the droplet a1 and droplet a2 has a overlap portion, which increases the number of jetted droplets per unit length, and thereby allows image recording at a high resolution. In this instance, it is preferable to deposit the first droplet a1 and droplet a2 within 1 second after applying the second liquid B to a recording medium.

The overlap ratio of droplets at an overlap portion refers to a value measured at the time of 1 second after at least the droplet a1 and droplet a2 are overlappedly jetted. In particular, the overlap ratio is preferably 10% to 90%, since it is effective for image recording with higher resolution.

Furthermore, the overlap ratio is more preferably 20% to 80%, and furthermore preferably 30% to 70%.

The above-described overlap ratio is an index showing the ratio of overlapping between adjacent droplets (droplet a1, droplet a2, . . . ). When the diameter of a droplet jetted on a recording medium is set at a and the portion of $\frac{1}{2}$a is overlapped, the overlap ratio is 50%. In the present invention, adjacently jetted droplets can keep the jetted shape without causing coalescence, and the overlap ratio is represented by $100 \times (2b-c)/2b$ [%], wherein b is the radius of the droplet measured at point in time of 1 second after deposition, and c is the distance interval of the adjacently jetted droplets (distance between the centers of the adjacent droplets).

The amount of deposition of the first droplet a1 and the first droplet a2 is not particularly limited, and can be selected in accordance with the sharpness of the image to be recorded. Usually, the amount is preferably about 0.5 pl to 10 pl per droplet. Furthermore, application of the second liquid B is not particularly limited as long as it is applied to the same area with or a wider area than the image area formed by the first droplet a1 and droplet a2.

Concerning the proportion of the applied amount of the second liquid B per one droplet of the first droplet a1 or the first droplet a2, when the amount of the droplet a1 or droplet a2 is 1, the amount of application of the second liquid B (mass ratio) is preferably in the range of 0.05 to 5, more preferably in the range of 0.07 to 1, and most preferably in the range of 0.1 to 1.

The first droplet a1 and/or droplet a2 is preferably jetted at a droplet size (volume) of 0.1 pL (picoliter; hereinafter the same shall apply) to 100 pL (preferably from an ink jet nozzle). When the droplet size is within the above-described range, an image with high sharpness can be formed at a high density. Furthermore, the size is more preferably 0.5 pL to 50 pL.

A time interval between the finishing point of the application of the second liquid B and the starting point of the jetting of each droplet of the first liquid A is in the range of 5 μ seconds to 400 m seconds. When the time interval is within the above-described range, the effect of the present invention is advantageously achieved. The time interval is more preferably 10 μ seconds to 300 m seconds, and most preferably 20 μ seconds to 200 μ seconds.

The physical properties of the first liquid (droplet) and second liquid (droplet) jetted on a recording medium by the ink jet recording method are different depending on apparatuses. In usual cases, the viscosity of them at 25° C. is preferably in the range of 5 to 100 mPa·s, and more preferably in the range of 10 to 80 mPa·s. The surface tension is preferably in the range of 20 to 60 mN/m, and more preferably in the range of 30 to 50 mN/m. In the relationship between the first liquid A and the second liquid B, the difference in viscosity (25° C.) is preferably 25 mPa·s or lower, and the difference in surface tension is preferably 20 mN/m or lower.

In the present invention, after jetting the first droplet a1 and droplet a2 after applying the second liquid B as described above, and then energy may be applied to fix the recorded image from the viewpoint of achieving excellent fixing properties. The application of energy promotes the curing reaction due to polymerization or crosslinking of the polymerizable or crosslinkable material contained in the liquids, thereby a more solid image is more effectively formed. For example, in a system containing a polymerization initiator, the application of active energy such as activation light and heat promotes the generation of active species due to the decomposition of the polymerization initiator, and the increased active species and temperature promote the curing reaction of the polymerizable or crosslinkable material due to polymerization or crosslinking caused by the active species.

The application of energy can be appropriately carried out by activation light irradiation or heating.

As the above-described activation light, for example, ultraviolet light, visible light, as well as α ray, γ ray, X ray, and electron beam or the like may be used. Among them, ultraviolet light and visible light are preferable, and ultraviolet light is most preferable from the viewpoints of cost and safety.

While the amount of energy necessary for curing reaction is different depending on the kind and content of the polymerization initiator, it is usually about 1 to 500 mJ/cm².

When energy is applied by heating, the heating treatment is preferably carried out for 0.1 to 1 second under conditions that the surface temperature of the recording medium is in the range of 40 to 80° C.

The heating treatment can be carried out by a non-contact type heating method. Preferable examples of the heating method include a heating method of passing through a heating furnace such as an oven, and a heating method by whole surface exposure with ultraviolet light to visible light to infrared light or the like. Examples of the light source suitable for exposure as a heating method include a metal halide lamp, a xenon lamp, a tungsten lamp, a carbon arc lamp, and a mercury lamp.

—Recording medium—

As the recording medium, an impermeable or slowly-permeable recording medium is used.

Examples of the impermeable recording medium include synthetic resins, rubber, resin coated paper, glass, metal, ceramic, and wood. Furthermore, these materials may be used in combination of two or more as composite substrates for the purpose of adding functions.

As the above-described synthetic resin, any synthesis resins may be used. Examples thereof include polyester such as polyethylene terephthalate, and polybutadiene terephthalate, polyolefin such as polyvinyl chloride, polystyrene, polyethylene, polyurethane, and polypropylene, acrylic resin, polycarbonate, acrylonitrile-butadiene-styrene copolymer, diacetate, triacetate, polyimide, cellophane, and celluloid. The thickness and shape of these synthesis resins are not particularly limited, and the shape may be either film, card, or block form. Furthermore, the resins may be either transparent or opaque.

The above-described synthesis resin is preferably used in film form which is suitable for so-called soft packaging, and examples thereof include various non-absorbing plastics and films thereof. Examples of the plastic film include a PET film, an OPS film, an OPP film, a PNy film, a PVC film, a PE film, and a TAC film. Other examples of the plastics include polycarbonate, acrylic resin, ABS, polyacetal, PVA, and rubbers.

Examples of the above-described resin coated paper include a transparent polyester film, an opaque polyester film, an opaque polyolefin resin film, and a paper support laminated with a polyolefin resin on both sides. Among them, a paper support laminated with a polyolefin resin on both side surfaces is most preferable.

The above-described metal is not particularly limited, and preferable examples thereof include aluminum, iron, gold, silver, copper, nickel, titanium, chromium, molybdenum, silicon, lead, zinc, stainless steel, and composite materials thereof.

Furthermore, read-only optical disks such as CD-ROM and DVD-ROM, write-once optical disks such as CD-R and DVD-R, and re-writable optical disks can be used, and an ink receiving layer and a brightening layer may be added to the label surface.

The first liquid A (droplets a1, a2, . . . ) and the second liquid B used in the ink jet recording method of the present invention, and the various constituents thereof are further described in detail.

—First liquid A (droplet ax including the first droplet a1 and droplet a2)—

The first liquid A (droplet ax including the first droplet a1 and droplet a2) according to the present invention is jetted on the below-mentioned second liquid B which has been previously applied to the recording medium to constitute a recorded image, comprises at least a polymerizable or crosslinkable material, and preferably comprises a colorant and a lipophilic solvent. As necessary, the liquid may further comprise a polymerization initiator or other components.

<Polymerizable or Crosslinkable Material>

The first liquid A (droplet ax including the first droplet a1 and droplet a2) contains at least one kind of polymerizable or crosslinkable material. The polymerizable or crosslinkable material has functions of causing polymerization or crosslinking reaction by an initiating species such as a radical generated from the below-mentioned polymerization initiator or the like, and curing.

As the polymerizable or crosslinkable material, known polymerizable or crosslinkable materials such as those causing radical polymerization reaction, cation polymerization reaction, or dimerization reaction (hereinafter collectively referred to as polymerizable material) can be used. Examples thereof include addition polymerizable compounds having at least one ethylene-based unsaturated double bond, epoxy-based compounds, oxetane-based compounds, oxirane-based compounds, polymer compounds having a maleimide in the side chain, and polymer compounds having a cinnamyl group, a cinnamylidene group, or a chalcone group, which has an unsaturated double bond capable of photodimerization adjacent to an aromatic nuclear, in the side chain. Among them, addition polymerizable compounds having at least one ethylene-based unsaturated double bond are more preferable, and those selected from the compounds (monofunctional or multifunctional compounds) having at least one, more preferably two or more terminal ethylene-based unsaturated bonds are most preferable. Specifically, the material can be selected from the compounds widely known in the industrial field of the present invention, and examples thereof include those having a chemical form of monomers, prepolymers or dimers, trimers, and oligomers, mixtures thereof, and copolymers thereof.

Specifically, preferable examples of the polymerizable or crosslinkable material include compounds having a polymerizable group such as an acryloyl group, a methacryloyl group, an allyl group, a vinyl group, and an internal double bond group (e.g. , maleic acid) within the molecule, and among them, compounds having acryloyl groups or methacryloyl groups are preferable from the viewpoint of causing curing reaction at low energy.

Examples of the above-described multifunctional compound include vinyl group-containing aromatic compounds, (meth)acrylates which are esters of a bivalent or higher valent alcohol and (meth)acrylic acid, (meth)acrylamides which are amides of a bivalent or higher valent amine and (meth)acrylic acid, polyester (meth)acrylate in which (meth)acrylic acid is introduced into an ester obtained by combining a polybasic acid with a bivalent alcohol or polycaprolactone, polyether (meth)acrylate in which (meth)acrylic acid is introduced into an ether obtained by combining an alkylene oxide with a polyvalent alcohol, epoxy (meth)acrylate obtained by introducing (meth)acrylic acid into an epoxy resin, or by reacting a bivalent or higher valent alcohol with a epoxy-containing monomer, urethane acrylates having urethane bonds, amino resin acrylates, acrylic resin acrylates, alkyd resin acrylates, spiran resin acrylates, silicone resin acrylates, reaction products of an unsaturated polyester and the above-described photopolymerizable monomer, and reaction products of a wax and the above-described polymerizable monomer.

Among them, (meth)acrylate, polyester (meth)acrylate, polyether (meth)acrylate, epoxy acrylate, urethane acrylate, acrylic resin acrylate, silicone resin acrylate, and reaction products of an unsaturated polyester and the above-described photopolymerizable monomer are preferable. Acrylate, polyester acrylate, polyether acrylate, epoxy acrylate, and urethane acrylate are most preferable.

In the present description, (meth)acrylic acid refers to both acrylic acid and methacrylic acid.

Specific examples of the above-described multifunctional compound include divinylbenzene, 1,3-butanediol diacrylate, 1,6-hexanediol diacrylate, pentaerythritol triacrylate, trimethylolpropane triacrylate, dipentaerythritol hexaacrylate, 1,6-acryloyl aminohexane, hydroxy pivalic acid ester neopentyl glycol diacrylate, polyester acrylate having (meth)acryloyl groups at the ends of the molecular chain of polyester composed which is produced by a dibasic acid and a divalent alcohol has a molecular weight of 500 to 30000, polyethyleneglycol diacrylate, epoxy acrylates having a bisphenol (A, S, or F) skeleton and a molecular weight of 450 to 30000, epoxy acrylates containing a phenol novolac resin skeleton and having a molecular weight of 600 to 30000, reactants of a polyvalent isocyanate and a (meth)acrylic acid monomer having hydroxy groups, and having a molecular weight of 350 to 30000, and urethane modified products having urethane bonds within the molecule.

Examples of the monofunctional compound include (meth)acrylate, styrene, acrylamide, vinyl group-containing monomers (e.g. , vinyl esters, vinyl ethers, and N-vinyl amides), and (meth)acrylic acid. Among them, (meth)acrylate, acrylamide, vinyl esters, and vinyl ethers are preferable, and (meth)acrylate and acrylamide are most preferable.

The polymerizable compound may be nonsubstituted or substituted. Examples of the possible substituent include a halogen atom, a hydroxy group, an amide group, and a carboxylic acid group.

Specific examples of the above-described monofunctional compound include hydroxyethyl acrylate, glycidyl acrylate, tetrahydrofurfuryl acrylate, dicyclopentenyl acrylate, 2-acryloyloxyethyl phosphate, allyl acrylate, N,N-dimethylaminoethyl acrylate, N,N-dimethyl acrylamide, N,N-diethyl aminopropyl acrylamide, N-butoxymethyl acrylamide, acryloyl morpholine, 2-hydroxyethylvinyl ether, N-vinyl formamide, N-vinyl acetamide, 2-cyclohexyl carbamoyloxyethyl acrylate, acrylates having a polybutyl acrylate moiety in an ester, and acrylates having a polydimethyl siloxane moiety in an ester.

The polymerizable or crosslinkable material may be used alone or in combination of two or more thereof.

The content of the polymerizable or crosslinkable material in the first liquid or, as necessary, in the second liquid is, preferably in the range of 50 to 99.6% by mass, more preferably in the range of 70 to 99.0% by mass, and further preferably in the range of 80 to 99.0% by mass based on the total solid (mass) of the droplets.

The content of the polymerizable or crosslinkable material in the droplets is preferably in the range of 20 to 98% by mass, more preferably in the range of 40 to 95% by mass, and most preferably in the range of 50 to 90% by mass based on the total weight or the droplets.

The first liquid A (droplet ax including the first droplet a1 and droplet a2) is prepared in such a manner that the difference of the sp value between the first liquid A and the second liquid B is 10 or less. When the difference of the sp value between the first droplet a1 and the second liquid B, which is applied before jetting the first droplet a1, is 10 or less, they have high affinity to each other, and the coalescence between the first droplet a1 and the subsequent droplet a2, which is jetted in contact with the first droplet a1, is effectively prevented. The sp value can be appropriately adjusted using a below-mentioned lipophilic solvent, a polymerizable material or the like. For example, the sp value can be reduced by increasing the proportion of a lipophilic solvent in the droplets.

Details and preferable embodiments of the colorant, lipophilic solvent, polymerization initiator, and other components which can be contained in the first liquid A (droplet ax including the first droplet a1 and droplet a2) will be described later.

—Second liquid B—

In the present invention, before jetting the aforementioned first droplet a1, the second liquid B, which has a composition different from that of the first droplet a1, droplet a2, . . . (the first liquid A), is applied to the recording medium in the same area with or a wider area than the image area formed onto the recording medium by at least the first droplet a1 and droplet a2.

The second liquid B has been prepared in such a manner it has a sp value of 35 or less. The second liquid B is water-insoluble, and adjusted to have properties of an oil-soluble organic solvent. At least the aforementioned first droplet a1 contains a polymerizable or crosslinkable material and can be appropriately prepared as an organic solvent. When the droplet is prepared as an organic solvent, it is readily mixed with the second liquid B, therefore coalescence between the first droplet a1 and droplet a2, which are overlappedly jetted in contact with each other, is effectively avoided. Accordingly, as aforementioned, image blurring and uneven line width of a thin line in an image are effectively prevented.

The sp value of the second liquid B can be appropriately adjusted using a lipophilic solvent or the like. In a preferable embodiment of the adjustment, the content of the lipophilic solvent is in the range of 50% by mass to 100% by mass based on the total weight of the second liquid B. When the content of the lipophilic solvent is within the above-described range, the sp value can be reduced to 35 or less. The sp value is preferably in the range of 30 or less.

<Lipophilic Solvent>

The lipophilic solvent is effective for preventing image blurring and uneven line width of a thin line in an image, and is capable of adjusting the sp value of the second liquid within the aforementioned range.

"Lipophilic" compounds refer to those having a solubility of 1 g or less in 100 cc of water.

The lipophilic solvent may be contained in the second liquid B and/or the aforementioned first liquid A. Alternatively, it may be contained in a liquid other than the second liquid B and the first liquid A.

Examples of the lipophilic solvent include high-boiling point organic solvents and above-described polymerizable materials, and is preferably a high-boiling point organic solvent.

Preferable high-boiling point organic solvents in the present invention are mainly described below.

The above-described high-boiling point organic solvent preferably has (1) a viscosity of 100 mPa·s or less at 25° C. or 30 mPa·s or less at 60° C., and (2) a boiling point higher than 100° C.

High-boiling point organic solvents which do not satisfy either of the viscosity conditions as described in above (1) are so viscous that they can hinder the application to a recording medium, and high-boiling point organic solvents which do not satisfy either of the viscosity conditions as described in above (2) can evaporate during image forming because they have a too low boiling point, which may result in the impairment of the effect of the present invention.

For the conditions as described in above (1), the viscosity at 25° C. is more preferably in the range of 70 mPa·s or lower, more preferably, in the range of 40 mPa·s or lower, and most preferably in the range of 20 mPa·s or lower. The viscosity at 60° C. is more preferably in the range of 20 mPa·s or lower, and most preferably in the range of 10 mPa·s or lower. For the conditions as described in above (2), the boiling point is more preferably in the range of 150° C. or higher, and most preferably in the range of 170° C. or higher. The lower limit of the melting point is preferably in the range of 80° C. or lower. Furthermore, the solubility of water (25° C.) is preferably 4 g or less, more preferably in the range of 3 g or less, further preferably in the range of 2 g or less, and most preferably in the range of 1 g or less.

The above-described "viscosity" has been determined using a RE80 type viscometer (manufactured by Toki Sangyo Co., Ltd.). The RE80 type viscometer is a conical-frustum type viscometer corresponding to an E type. The viscosity was measured at a rotational speed of 10 r.p.m. using a rotor of rotor code No.1. The rotational speed was as necessary changed to 5 r.p.m., 2.5 r.p.m., 1 r.p.m., 0.5 r. p.m., or others for measuring solvents having a viscosity higher than 60 mPa·s. "Solubility of water" refers to the saturation density of water in a high-boiling point organic solvent at 25° C., and means the mass (g) of water soluble in 100 g of the high-boiling point organic solvent at 25° C.

As the above-described high-boiling point organic solvent, the compounds represented by the following formulae [S-1] to [S-9] are preferable.

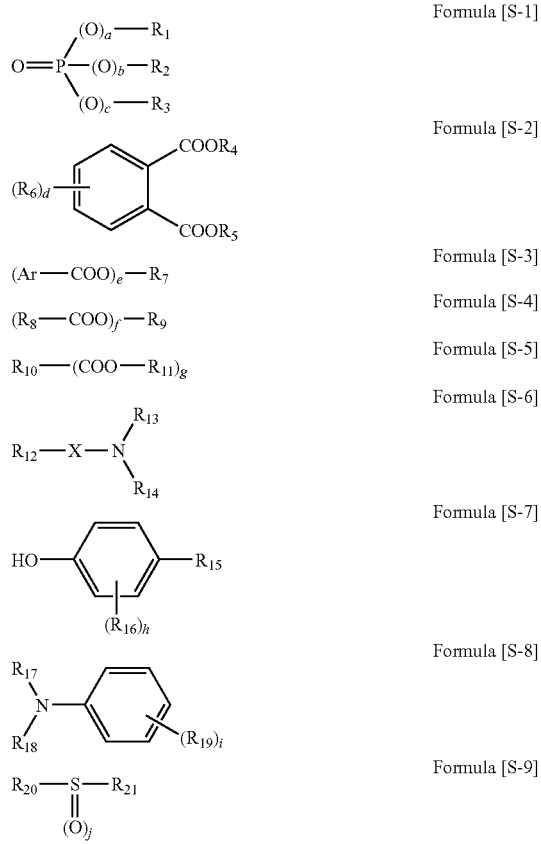

In the above-described formula [S-1], $R_1$, $R_2$ and $R_3$ each independently represent an aliphatic group or an aryl group. a, b, and c each independently represent 0 or 1.

In the formula [S-2], $R_4$ and $R_5$ each independently represent an aliphatic group or an aryl group, $R_6$ represents a halogen atom (F, Cl, Br, I, hereinafter the same), an alkyl group, an alkoxy group, an aryloxy group, an alkoxycarbonyl group, or an aryloxycarbonyl group, and d represents an integral number of 0 to 3. When d is two or more, a plurality of $R_6$s may be the same or different from each other.

In the formula [S-3], Ar represents an aryl group, e represents an integral number of 1 to 6, and $R_7$ represents a hydrocarbon group having a valence of e or hydrocarbon groups linked each other by an ether bond.

In the formula [S-4], $R_8$ represents an aliphatic group, f represents an integral number of 1 to 6, and $R_9$ a hydrocarbon group having a valence of f or hydrocarbon groups linked each other by an ether bond.

In the formula [S-5], g represents an integral number of 2 to 6, $R_{10}$ represents a hydrocarbon group having a valence of g (excluding an aryl group), and $R_{11}$ represents an aliphatic group or an aryl group.

In the formula [S-6], $R_{12}$, $R_{13}$ and $R_{14}$ each independently represent hydrogen atom, an aliphatic group, or an aryl group. X represents —CO— or —$SO_2$—. $R_{12}$ and $R_{13}$ or $R_{13}$ and $R_{14}$ may be linked each other to form a ring.

In the formula [S-7], $R_{15}$ represents an aliphatic group, an alkoxycarbonyl group, an aryloxycarbonyl group, an alkylsulfonyl group, an arylsulfonyl group, an aryl group or a cyano group, $R_{16}$ represents a halogen atom, an aliphatic group, an aryl group, an alkoxy group or an aryloxy group, h represents an integral number of 0 to 3. When h is two or more, a plurality of $R_{16}$s may be the same or different.

In the formula [S-8], $R_{17}$ and $R_{18}$ each independently represent an aliphatic group or an aryl group, $R_{19}$ represents a halogen atom, an aliphatic group, an aryl group, an alkoxy group, or an aryloxy group, i represents an integral number of 0 to 5. When i is two or more, a plurality of $R_{19}$s may be the same or different from.

In the formula [S-9], $R_{20}$ and $R_{21}$ each independently represent an aliphatic group or an aryl group. j represents 1 or 2. $R_{20}$ and $R_{21}$ may be linked each other to form a ring.

In the formulae [S-1] to [S-9], when $R_1$ to $R_6$, $R_8$, $_{R11}$ to $R_{21}$ are group containing an aliphatic group or an aliphatic group, the aliphatic group may be straight-chain, branched-chain, or cyclic, and may contain unsaturated bonds or have substituents. Examples of the substituent include a halogen atom, an aryl group, an alkoxy group, an aryloxy group, an alkoxycarbonyl group, a hydroxy group, an acyloxy group, and an epoxy group.

In the formulae [S-1] to [S-9], when $R_1$ to $R_6$, $R_8$, $R_{11\ to\ R21}$ are cyclic aliphatic groups, namely cycloalkyl groups or groups containing a cycloalkyl group, the cycloalkyl group may contain unsaturated bonds within a 3- to 8-membered ring, and may have substituents or crosslinking groups. Examples of the substituent include a halogen atom, an aliphatic group, a hydroxy group, an acyl group, an aryl group, an alkoxy group, and an epoxy group, and examples of the crosslinking group include methylene, ethylene, and isopropylidene.

In the formulae [S-1] to [S-9], when $R_1$ to $R_6$, $R_8$, $R_{11}$ to $R_{21}$ Ar, are aryl groups or groups containing an aryl group, the aryl group may be substituted with a substituent such as a halogen atom, an aliphatic group, an aryl group, an alkoxy group, an aryloxy group, and alkoxycarbonyl group.

In the formulae [S-3], [S-4], and [S-5], when $R_7$, $R_9$ or $R_{10}$ is a hydrocarbon group, the hydrocarbon group may contain a cyclic structure (e.g., a benzene ring, a cyclopentane ring, a cyclohexane ring) or an unsaturated bond, and may have substituents. Examples of the substituent include a halogen atom, a hydroxy group, an acyloxy group, an aryl group, an alkoxy group, an aryloxy group, and epoxy group.

Among the high-boiling point organic solvents represented by the formulae [S-1] to [S-9], the most preferable high-boiling point organic solvents are further described below.

In the formula [S-1], $R_1$, $R_2$, and $R_3$ are each independently preferably an aliphatic group having 1 to 24 (preferably 4 to 18) carbon atoms (e.g., n-butyl, n-hexyl, n-octyl, EH-octyl, 2-ethylhexyl, 3,3,5-trimethylhexyl, 3,5,5-trimethylhexyl, n-dodecyl, n-octadecyl, benzyl, oleyl, 2-chloroethyl, 2,3-dichloropropyl, 2-butoxyethyl, 2-phenoxyethyl, cyclopentyl, cyclohexyl, 4-t-butylcyclohexyl, and 4-methylcyclohexyl), or an aryl group having 6 to 24 (preferably 6 to 18) carbon atoms (e.g., phenyl, cresyl, p-nonyl phenyl, xylyl, cumenyl, p-methoxyphenyl, and p-methoxycarbonylphenyl). Among them, $R_1$, $R_2$, and $R_3$ are most preferably n-hexyl, n-octyl, EH-octyl, 2-ethylhexyl, 3,5,5-trimethylhexyl, n-dodecyl, 2-chloroethyl, 2-butoxyethyl, cyclohexyl, phenyl, cresyl, p-nonyl phenyl, or cumenyl.

Each of a, b, and c represents 0 or 1, and more preferably all of a, b, and c are 1.

In the formula [S-2], $R_4$ and $R_5$ are each independently preferably an aliphatic group having 1 to 24 (preferably 4 to 18) carbon atoms (e.g., the aliphatic groups as listed for the above-described $R_1$, heptyl, ethoxycarbonylmethyl, 1,1-diethylpropyl, 2-ethyl-1-methylhexyl, cyclohexylmethyl, 1-ethyl-1,5-dimethylhexyl, 3,5,5-trimethylcyclohexyl, menthyl, bomyl, 1-methylcyclohexyl), or an aryl group having 6 to 24 (preferably 6 to 18) carbon atoms (e.g., the aryl groups as listed for the above-described $R_1$, 4-t-butylphenyl, 4-t-octylphenyl, 1,3,5-trimethylphenyl, 2,4,-di-t-butylphenyl, and 2,4,-di-t-pentyl phenyl). Among them, $R_4$ and $R_5$ are more preferably an aliphatic group, and most preferably n-butyl, heptyl, 2-ethylhexyl, n-dodecyl, 2-butoxyethyl, or ethoxycarbonylmethyl.

$R_6$ is preferably a halogen atom (preferably, a chlorine atom), an alkyl group having 1 to 18 carbon atoms (e.g., methyl, isopropyl, t-butyl, and n-dodecyl), an alkoxy group having 1 to 18 carbon atoms (e.g., methoxy, n-butoxy, n-octyloxy, methoxyethoxy, and benzyloxy), an aryloxy group having 6 to 18 carbon atoms (e.g., phenoxy, p-tolyloxy, 4-methoxyphenoxy, and 4-t-butylphenoxy), an alkoxycarbonyl group having 2 to 19 carbon atoms (e.g., methoxycarbonyl, n-butoxycarbonyl, 2-ethylhexyloxycarbonyl), or an aryloxycarbonyl group having 6 to 25 carbon atoms. Among them, $R_6$ is more preferably an alkoxycarbonyl group, and most preferably n-butoxycarbonyl.

d is 0 or 1.

In the formula [S-3], Ar is preferably an aryl group having 6 to 24 (preferably 6 to 18) carbon atoms (e.g., phenyl, 4-chlorophenyl, 2,4-dichlorophenyl, 4-methoxyphenyl, 1-naphthyl, 4-n-butoxyphenyl, 1,3,5-trimethylphenyl, and 2-(2-n-butoxycarbonylphenyl)phenyl). Among them, Ar is more preferably phenyl, 2,4-dichlorophenyl, or 2-(2-n-butoxy carbonyl phenyl)phenyl.

e is an integral number of 1 to 4 (preferably 1 to 3).

$R_7$ is preferably a hydrocarbon group having a valence of e and having 2 to 24 (preferably 2 to 18) carbon atoms [e.g., the aliphatic groups as listed for the above-described $R_4$, n-octyl, the aryl groups as listed for the above-described $R_4$, —$(CH_2)_2$—,

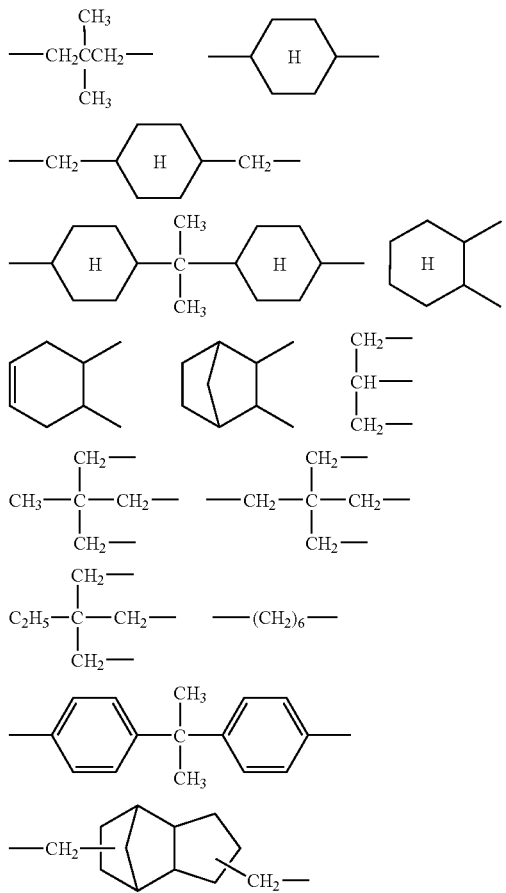

] or hydrocarbon groups having a valence of e and having 4 to 24 (preferably 4 to 18) carbon atoms which are linked each other by an ether bond [e.g., —$CH_2CH_2OCH_2CH_2$—, —$CH_2CH_2(OCH_2CH_2)_3$—, —$CH_2CH_2CH_2OCH_2CH_2CH_2$—].

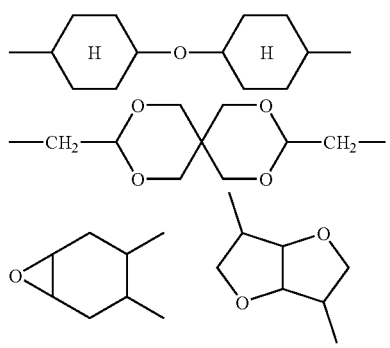

Among them, $R_7$ is more preferably an alkyl group, and most preferably n-butyl, n-octyl, or 2-ethylhexyl.

In the formula [S-4], $R_8$ is preferably an aliphatic group having 1 to 24 (preferably 1 to 17) carbon atoms (e.g., methyl, n-propyl, 1-hydroxyethyl, 1-ethylpentyl, n-heptyl, n-undecyl, n-tridecyl, pentadecyl, 8,9-epoxy heptadecyl, cyclopropyl, cyclohexyl, and 4-methylcyclohexyl). Among them, $R_8$ is most preferably n-heptyl, n-tridecyl, 1-hydroxy ethyl, 1-ethylpentyl, or 8,9-epoxyheptadecyl.

f is an integral number of 1 to 4 (preferably 1 to 3).

$R_9$ is preferably a hydrocarbon group having a valence of f and having 2 to 24 (preferably 2 to 18) carbon atoms, or hydrocarbon groups having a valence of f and 4 to 24 (preferably 4 to 18) carbon atoms which are linked each other by an ether bond (e.g., the groups as listed for the above-described $R_7$, 1-methyl-2-methoxyethyl, and 2-hexyldecyl). Among them, $R_9$ is most preferably 2-ethylhexyl, 2-hexyldecyl, or 1-methyl-2-methoxyethyl.

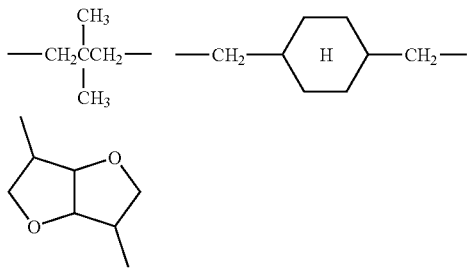

In the formula [S-5], g is 2 to 4 (preferably 2 or 3).

$R_{10}$ is preferably a hydrocarbon group having a valence of g [for example, $-CH_2-$, $-(CH_2)_2-$, $-(CH_2)_4-$, $-(CH_2)_7-$, or $-(CH_2)_8-$].

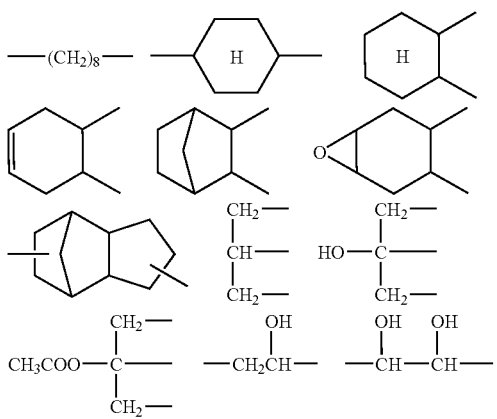

Among them, $R_{10}$ is most preferably, $-(CH_2)_4-$ or $-(CH_2)_8-$.

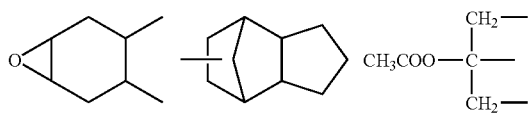

$R_{11}$ is preferably an aliphatic group having 1 to 24 (preferably 4 to 18) carbon atoms, or aryl group having 6 to 24 (preferably 6 to 18) carbon atoms (e.g., the aliphatic groups and aryl groups as listed for the above-described R4). Among them, $R_{11}$ is more preferably an alkyl group, and most preferably n-butyl, n-octyl, or 2-ethylhexyl.

In the formula [S-6], $R_{12}$ is preferably hydrogen atom, an aliphatic group having 1 to 24 (preferably 3 to 20) carbon atoms [e.g., n-propyl, 1-ethyl pentyl, n-undecyl, n-pentadecyl, 2,4-di-t-pentylphenoxymethyl, 4-t-octylphenoxymethyl, 3-(2,4-di-t-butylphenoxy)propyl, 1-(2,4-di-t-butylpenoxy)propyl, cyclohexyl, 4-methylcyclohexyl, and 8-N,N-diethylcarbamoyloctyl], or an aryl group having 6 to 24 (preferably 6 to 18) carbon atoms (e.g., the aryl group as listed for the above-described Ar, 3-methylphenyl, and 2-(N,N-di-n-octylcarbamoyl)phenyl). Among them, $R_{12}$ is most preferably n-undecyl, 8-N,N-diethylcarbamoyloctyl, 3-methylphenyl, or 2-(N,N-di-n-octylcarbamoyl)phenyl.

$R_{13}$ and $R_{14}$ are each preferably hydrogen atom, an aliphatic group having 1 to 24 (preferably 1 to 18) carbon atoms (e.g., methyl, ethyl, isopropyl, n-butyl, n-hexyl, n-octyl, 2-ethylhexyl, n-dodecyl, n-tetradecyl, cyclopentyl, and cyclopropyl), or an aryl group having 6 to 18 (preferably 6 to 15) carbon atoms (e.g., phenyl, 1-naphthyl, and p-tolyl). Among them, $R_{13}$ and $R_{14}$ are each most preferably methyl, ethyl, n-butyl, n-octyl, n-tetradecyl, or phenyl. $R_{13}$ and $R_{14}$ may be linked each other to form a pyrrolidine ring, a piperidine ring, or a morpholine ring together with N. $R_{12}$ and $R_{13}$ may be linked each other to form a pyrrolidone ring or a piperidine ring together with N.

X is $-CO-$ or $-SO_2-$, and preferably X is $-CO-$.

In the formula [S-7], $R_{15}$ is preferably an aliphatic group having 1 to 24 (preferably 3 to 18) carbon atoms (e.g., methyl, isopropyl, t-butyl, t-pentyl, t-hexyl, t-octyl, 2-butyl, 2-hexyl, 2-octyl, 2-dodecyl, 2-hexadecyl, t-pentadecyl, cyclopentyl, and cyclohexyl), an alkoxycarbonyl group having 2 to 24 (preferably 5 to 17) carbon atoms (e.g., n-butoxycarbonyl, 2-ethylhexyloxycarbonyl, and n-dodecyloxycarbonyl), an aryloxycarbonyl group having 7 to 24 (preferably 7 to 18) carbon atoms (e.g., phenoxycarbonyl group, naphthoxycarbonyl group, and cresyloxycarbonyl group), an alkylsulfonyl group having 1 to 24 (preferably 1 to 18) carbon atoms (e.g., methylsulfonyl, n-butylsulfonyl, and n-dodecylsulfonyl), an arylsulfonyl group having 6 to 30 (preferably 6 to 24) carbon atoms (e.g., p-tolylsulfonyl, p-dodecylphenylsulfonyl, and p-hexadecyloxyphenylsulfonyl), an aryl group having 6 to 32 (preferably 6 to 24) carbon atoms (e.g., phenyl and p-tolyl), or a cyano group. Among them, $R_{15}$ is more preferably an aliphatic group having 1 to 24 carbon atoms or an alkoxycarbonyl group having 2 to 24 carbon atoms, and most preferably an aliphatic group having 1 to 24 carbon atoms.

$R_{16}$ is preferably a halogen atom (preferably Cl), an aliphatic group having 1 to 24 (preferably 1 to 18) carbon atoms {more preferably, an alkyl group (e.g., the alkyl group as listed for the above-described $R_{15}$), a cycloalkyl group having 3 to 18 (more preferably 5 to 17) carbon atoms (e.g., cyclopentyl and cyclohexyl)}, an aryl group having 6 to 32 (preferably 6 to 24) carbon atoms (e.g., phenyl and p-tolyl), an alkoxy group having 1 to 24 (preferably 1 to 18) carbon atoms (e.g., methoxy, n-butoxy, 2-ethylhexyloxy, benzyloxy, n-dodecyloxy, n-hexadecyloxy), or an aryloxy group having 6 to 32 (preferably 6 to 24) carbon atoms (e.g., phenoxy, p-t-butylphenoxy, p-t-octylphenoxy, m-pentadecylphenoxy, and p-dodecyloxyphenoxy). Among them, $R_{16}$ is more preferably an aliphatic group having 1 to 24 carbon atom, and most preferably an aliphatic group having 1 to 12 carbon atoms.

h is an integral number of 1 to 2.

In the formula [S-8], preferable examples of $R_{17}$ and $R_{18}$ are the same as those listed for the above-described $R_{13}$ and $R_{14}$ except for hydrogen atom. Among them, $R_{17}$ and $R_{18}$ are each more preferably an aliphatic group, and most preferably n-butyl, n-octyl, or n-dodecyl. $R_{17}$ and $R_{18}$ cannot be linked each other to form a ring.

Preferable examples of $R_{19}$ are the same as those listed for the above-described $R_{16}$. Among them, $R_{19}$ is more preferably an alkyl group or an alkoxy group, and most preferably n-octyl, methoxy, n-butoxy, or n-octyloxy.

i is an integral number of 1 to 5.

In the formula [S-9], preferable examples of $R_{20}$ and $R_{21}$ are the same as those listed for the above-described $R_1$, $R_2$, and $R_3$ when they do not form a ring. Among them, $R_{20}$ and $R_{21}$ are most preferably a substituted or nonsubstituted aliphatic group having 1 to 24 carbon atoms. $R_{20}$ and $R_{21}$, may be linked each other to form a ring, and the formed ring has preferably 3 to 10 members, and most preferably 5 to 7 members.

j represents 1 or 2, and preferably j is 1.

Specific examples of the high-boiling point organic solvent (compounds S-1 to S-53), and the viscosity (measured at temperatures of 25° C. and 60° C. using the above-described means; mPa·s) and boiling point (° C.) of the high-boiling point organic solvents are summarized below.

The boiling point of the high-boiling point organic solvents has been calculated by converting from the boiling point during distillation under reduced pressure to that under normal pressure. In the following specific examples, the compounds whose boiling point is not shown have been confirmed not to boil at 170° C., and the compounds whose viscosity at 25° C. is not shown are solid at 25° C.

| | | Viscosity (mPa·s) | | Boiling Point |
|---|---|---|---|---|
| | | (25° C.) | (60° C.) | (° C.) |
| Compounds represented by the formula [S-1] | | | | |
| S-1 | O=P(-O-C₆H₅)₃ | — | 8.3 | 370 |
| S-2 | O=P(-O-C₆H₄-CH₃)₃ | 57.6 | 11.8 | 435 |
| S-3 | O=P(-O-C₆H₄-C₃H₇(i))₃ | 95 | 17.5 | 485 |
| S-4 | O=P(-O-C₆H₅)₂(-O-C₆H₄-CH₃) | 65 | 12.8 | 435 |
| S-5 | O=P(-O-C₆H₄-C₉H₁₉(n))₂(OC₁₀H₂₁) | 49 | 10.3 | 435 |
| S-6 | O=P(OCH₂CHC₄H₉(n))₃ with C₂H₅ branch | 11.7 | 4.0 | 390 |
| S-7 | O=P(OCH₂CH₂CHCH₂CCH₃)₃ with CH₃, CH₃, CH₃ | 20.22 | 5.8 | 420 |
| S-8 | O=P(OC₁₂H₂₅(n))₃ | 28.6 | 6.9 | 480 |
| S-9 | O=P(OC₆H₁₃(n))₃ | 6.62 | 3.0 | 365 |
| S-10 | O=P(OCH₂CH₂Cl)₃ | 20.8 | 5.5 | 360 |
| S-11 | O=P(OCH₂CH₂OC₄H₉(n))₃ | 10.9 | 3.8 | 400 |
| S-12 | ((EH)C₈H₁₇)₃P=O | 41.1 | 9.0 | — |
| S-13 | (n)C₈H₁₇—P(OC₈H₁₇(n))₂=O | 13.7 | 4.3 | — |

-continued
| | | Viscosity (mPa · s) | | Boiling Point |
|---|---|---|---|---|
| | | (25° C.) | (60° C.) | (° C.) |
Compounds represented by the formula [S-2]
| S-14 | 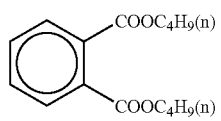 | 20.3 | 5.1 | 370 |
| S-15 | 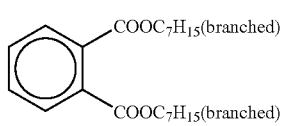 | 34.9 | 8.0 | 380 |
| S-16 | 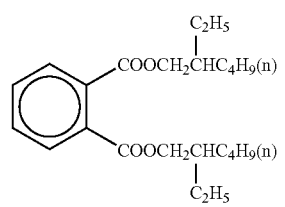 | 62.7 | 11.7 | 400 |
| S-17 | 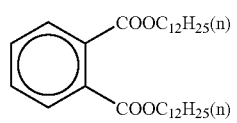 | 52.1 | 10.8 | — |
| S-18 | 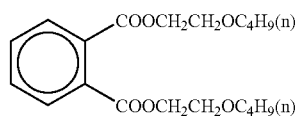 | 42 | 9.1 | 335 |
| S-19 | 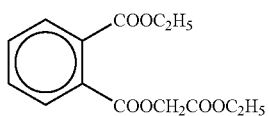 | 74 | 14.2 | 355 |
| S-20 | 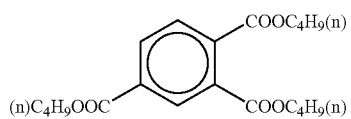 | 55.7 | 13.1 | 400 |
Compounds represented by the formula [S-3]
| S-21 | 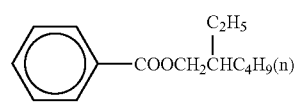 | 5.68 | 2.4 | 300 |
| S-22 | 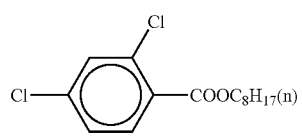 | 11.44 | 3.9 | 360 |

|  | | Viscosity (mPa·s) | | Boiling Point (°C.) |
|---|---|---|---|---|
|  |  | (25° C.) | (60° C.) |  |
| S-23 | ![S-23 structure: biphenyl with two COOC4H9(n) groups] | 51.1 | 10.6 | — |

Compounds represented by the formula [S-4]

| S-24 | (n)C₁₃H₂₇COOCH(CH₃)CH₂OCH₃ | 7.17 | 3.1 | 380 |
|---|---|---|---|---|
| S-25 | (n)C₈H₁₇CH—CH(CH₂)₇COOCH₂CH(C₂H₅)C₄H₉(n) (with epoxide O) | 39.84 | 8.8 | — |
| S-26 | CH₃CH(OH)COOCH₂CH(C₆H₁₃(n))C₈H₁₇(n) | 22.83 | 5.9 | — |
| S-27 | (n)C₄H₉CH(C₂H₅)COOCH₂C(CH₃)(C₂H₅)CH₂OCOCH(C₂H₅)C₄H₉(n) | 12 | 4.0 | — |
| S-28 | (n)C₄H₉CH(C₂H₅)COOCH₂—[cyclohexyl-H]—CH₂OCOCH(C₂H₅)C₄H₉(n) | 41.4 | 9.0 | 430 |
| S-29 | (n)C₇H₁₅COO—[bicyclic difuran]—OCOC₇H₁₅(n) | 47.3 | 10.0 | 440 |

Compounds represented by the formula [S-5]

| S-30 | (n)C₄H₉CH(C₂H₅)CH₂OCO(CH₂)₄COOCH₂CH(C₂H₅)C₄H₉(n) | 11.7 | 4.3 | 390 |
|---|---|---|---|---|
| S-31 | (n)C₄H₉CH(C₂H₅)CH₂OCO(CH₂)₈COOCH₂CH(C₂H₅)C₄H₉(n) | 19.9 | 6.1 | 410 |
| S-32 | (n)C₄H₉OCO(CH₂)₈COOC₄H₉(n) | 8.09 | 3.5 | 345 |
| S-33 | [epoxycyclohexane with two COOC₈H₁₇(n) groups] | 88.9 | 16.5 | — |
| S-34 | (n)C₄H₉OCO—[bicyclic]—COOC₄H₉(n) | 37.50 | 8.4 | 440 |

| | | Viscosity (mPa·s) | | Boiling Point |
|---|---|---|---|---|
| | | (25° C.) | (60° C.) | (° C.) |
| S-35 | 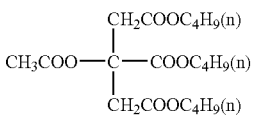 | 42.7 | 9.3 | 390 |
Compounds represented by the formula [S-6]
| S-36 | 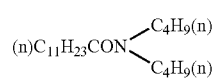 | 9.45 | 3.6 | 340 |
|---|---|---|---|---|
| S-37 | 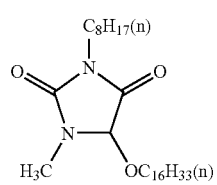 | 45.8 | 9.8 | — |
| S-38 | 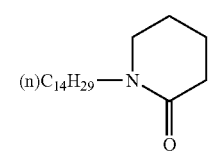 | 20.0 | 5.4 | 350 |
| S-39 | 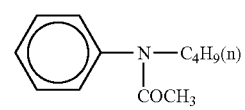 | 12.83 | 4.2 | 320 |
| S-40 | 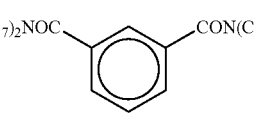 | 77.1 | 14.7 | — |
| S-41 | $(C_2H_5)_2\text{—NCO—}(CH_2)_8\text{—CON}(C_2H_5)_2$ | 40.7 | 8.9 | 405 |
| S-42 | 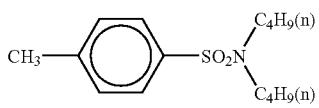 | 49.65 | 10.4 | — |
Compounds represented by the formula [S-7]
| S-43 | 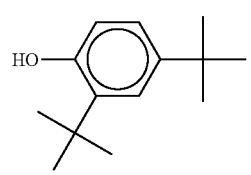 | 92 | 16.9 | — |
|---|---|---|---|---|
Compounds represented by the formula [S-8]
| S-44 | 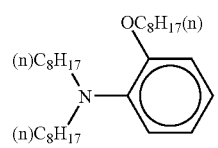 | 15.5 | 4.6 | — |
|---|---|---|---|---|

-continued

| | | Viscosity (mPa · s) | | Boiling Point |
|---|---|---|---|---|
| | | (25° C.) | (60° C.) | (° C.) |
| S-45 | OCH₃ structure with (n)C₁₂H₂₅ groups on N, and dimethoxy phenyl | 27.1 | 6.6 | — |
| S-46 | (n)C₈H₁₇ groups on N, methoxyphenyl | 35.3 | 8.0 | — |
| S-47 | (n)C₄H₉ groups on N, OC₄H₉(n), C₈H₁₇(t) phenyl | 79.14 | 15.0 | — |

Compounds represented by formula [S-9]

| S-48 | Sulfolane with C₈H₁₇(EH) substituent | 37.62 | 8.4 | — |
| S-49 | Ph-CH₂SOCH(C₁₂H₂₅(n))COOC₂H₅ | 43.1 | 9.3 | — |

Other Compounds

| S-50 | $C_nH_{2n+1}$ (a mixture of n-paraffin n = 14 and 15) (For example, product name NP-SH: manufactured by Mitsui-Texaco Chemicals Co., Ltd.) | 2.47 | 0.4 | 260 |
| S-51 | OC₆H₁₃(n), C₅H₁₁(t), C₅H₁₁(t) phenyl | 35.85 | 8.1 | 330 |
| S-52 | (Ph)₂P(O)-N(C₈H₁₇(n))₂ | 45.9 | 9.8 | — |
| S-53 | HO-C(CH₂COOC₄H₉(n))(COOC₄H₉(n))(CH₂COOC₄H₉(n)) | 25.82 | 6.7 | — |

The high-boiling point organic solvent may be used alone or in combination of two or more thereof [e.g., tticresylphosphate and dibutyl phthalate, trioctylphosphate and di(2-ethylhexyl)sebacate, dibutyl phthalate and poly(N-t-butylacrylamide)].

Other examples of the high-boiling point organic solvents except for the above-described compounds, and /or the method for synthesizing these high-boiling point organic solvents are, for example, described in U.S. Pat. Nos. 2,322,027, 2,533,514, 2,772,163, 2,835,579, 3,594,171, 3,676,137, 3,689,271, 3,700,454, 3,748,141, 3,764,336, 3,765,897, 3,912,515, 3,936,303, 4,004,928, 4,080,209, 4,127,413, 4,193,802, 4,207,393, 4,220,711, 4,239,851, 4,278,757, 4,353,979, 4,363,873, 4,430,421, 4,430,422, 4,464,464, 4,483,918, 4,540,657, 4,684,606, 4,728,599, 4,745,049, 4,935,321, and 5,013,639, European Patent Application Laid-Open (EP-A) Nos. 276,319A, 286,253A, 289,820A, 309,158A, 309,159A, 309,160A, 509,311A, and 510,576A, East German Patent Nos. 147,009, 157,147, 159,573, and 225,240A, U.K. Patent No. 2,091,124A, and JP-A Nos. 48-47335, 50-26530, 51-25133, 51-26036, 51-27921, 51-27922, 51-149028, 52-46816, 53-1520, 53-1521, 53-15127, 53-146622, 54-91325, 54-106228, 54-118246, 55-59464, 56-64333, 56-81836, 59-204041, 61-84641, 62-118345, 62-247364, 63-167357, 63-214744, 63-301941, 64-9452, 64-9454, 64-68745, 1-101543, 1-102454, 2-792, 2-4239, 2-43541, 4-29237, 4-30165, 4-232946, and 4-346338.

In the present invention, high-boiling point organic solvents having a boiling point higher than 100° C. are preferable, and high-boiling point organic solvents having a boiling point higher than 170° C. are more preferable.

The amount of the addition of the lipophilic solvent to the second liquid is preferably in the range of 50% by mass to 100% by mass, more preferably 70% by mass to 100% by mass, and most preferably 90% by mass to 100% by mass based on the total weight of the liquid.

The second liquid B preferably contains a polymerization initiator. More preferably, the second liquid B additionally contains a lipophilic solvent, and as necessary, may contain a colorant, a polymerizable material and/or other components. Details of the polymerizable material are as described above.

<Polymerization Initiator>

The second liquid B can appropriately contain at least one polymerization initiator. The polymerization initiator is a compound which generates initiating species such as a radical by the application of activation light and/or heat, thereby initiates and promotes the polymerization or crosslinking reaction of a polymerizable or crosslinkable material to cure the material.

The polymerization initiator is preferably contained in isolation from polymerizable material from the viewpoint of securing the storage stability of the aforementioned first liquid A and the second liquid B. In the present invention, the polymerization initiator is preferably contained not in the first liquid A containing the polymerizable material but in the second liquid B or any other liquids.

The polymerization initiator may be selected from known photopolymerization initiators (including radical generators), heat polymerization initiators, and compounds having a bond whose dissociation energy is low.

Examples of the photopolymerization initiator (including radical generator) include organic halogenated compounds, carbonyl compounds, organic peroxide compounds, azo-based polymerization initiators, azido compounds, metallocene compounds, hexaarylbiimidazol compounds, organic borate compounds, disulfate compounds, and onium salt compounds.

Preferable examples of the polymerization initiator include following photopolymerization initiators.

Examples of the photopolymerization initiator include acetophenone derivatives, benzophenone derivatives, benzyl derivatives, benzoin derivatives, benzoin ether derivatives, benzyldialkylketal derivatives, thioxanthone derivatives, acylphosphine oxide derivatives, metal complexes, p-dialkylamino benzoic acid, azo compounds, and peroxide compounds. Among them, acetophenone derivatives, benzyl derivatives, benzoin ether derivatives, benzyldialkylketal derivatives, thioxanthone derivatives, and acylphosphine oxide derivatives are preferable, and acetophenone derivatives, benzoin ether derivatives, benzyldialkylketal derivatives, and acyl phosphine oxide derivatives are most preferable.

Specific examples of the above-described photopolymerization initiator include acetophenone, 2,2-diethoxyacetophenone, p-dimethylaminoacetophenone, p-dimethylaminopropiophenone, benzophenone, p,p'-dichlorobenzophenone, p,p'-bisdiethylaminobenzophenone, Michler ketone, benzyl, benzoin, benzoin methyl ether, benzoin isopropyl ether, benzoin-n-propyl ether, benzoin isobutyl ether, benzyl dimethyl ketal, 1-hydroxy-cyclohexyl phenyl ketone, tetramethylthiuram monosulfide, thioxanthone, 2-chlorothioxanthone, 2,4-dimethyl thioxanthone, 2,2-dimethylpropioyldiphenylphosphine oxide, 2-methyl-2-ethylhexanoyldiphenylphosphine oxide, 2,6-dimethylbenzoyldiphenylphosphine oxide, 2,6-dimethoxybenzoyldiphenylphosphine oxide, 2,4,6-trimethylbenzoyldiphenylphosphine oxide, bis(2,6-dimethoxybenzoyl)-2,4,4-trimethylpentylphosphine oxide, 2,3,6-trimethylbenzoyl-diphenylphosphine oxide, bis(2,3,6-trimethylbenzoyl)-phenylphosphine oxide, 2,4,6-trimethoxybenzoyl-diphenylphosphine oxide, 2,4,6-trichlorobenzoyldiphenylphosphine oxide, 2,4,6-trimethylbenzoylnaphthyl phosphonate, bis($\eta^5$-2,4-cyclopentadiene-1-yl)-bis(2,6-difluoro-3-(1H-pyrrole-1-yl)-phenyl) titanium, p-dimethylaminobenzoic acid, p-diethylaminobenzoic acid, azobisisobutyronitrile, 1,1'-azobis(1-acetoxy-1-phenylethane), benzoin peroxide, and di-tert-butyl peroxide.

In addition to the above-described compounds, other preferable examples of the photopolymerization initiator are described in "Shigaisen Koka System (Ultraviolet Curing System)", Kiyoshi Kato (Sogo Gijutsu Center, 1989) p. 65 to 148.

The polymerization initiator is preferably excellent in sensitivity. For example, polymerization initiators which cause thermal decomposition at a temperature of 80° C. or lower are not preferable from the viewpoint of storage stability.

The polymerization initiator may be used alone or in combination two or more thereof. Furthermore, known sensitizers also may be used for the purpose of improving sensitivity in the range that the effect of the present invention may not be impaired.

When the first liquid A and the second liquid B are jetted on a medium at the maximum amount required for image formation, the content of the polymerization initiator in the second liquid B is preferably 0.5 to 20% by mass, more preferably 1 to 15% by mass, and most preferably 3 to 10% by mass based on the polymerizable material per unit area, from the viewpoint of temporal stability, curability, and curing rate. If the content is excessive, precipitation or separation may occur with time, and ink properties such as strength and scratch resistance may be deteriorated after curing.

When a polymerization initiator is contained in the aforementioned the first liquid A as well as the second liquid B in the appropriate range that the storage stability of the first liquid A is maintained at a desired degree.

The polymerization initiator may be contained not in the second liquid B but in the aforementioned first liquid A. In this instance, the content in the first droplet is preferably 0.5 to 20% by mass, and more preferably 1 to 15% by mass based on the polymerizable or crosslinking compound in the first liquid A.

<Colorant>

At least one type of colorant may be contained in the aforementioned first liquid A to allow the formation of a single-color or multi-color visible image.

The colorant may be contained in the second liquid B or other liquids.

The colorant is not particularly limited, and can be selected as appropriate from known water soluble dyes, oil-soluble dyes, pigments and the like. Among them, oil-soluble dyes and pigments which are uniformly dispersible and soluble in an water-insoluble medium are preferable, because the first liquid A and the second liquid B according to the present invention are preferably composed on the basis of an water-insoluble organic solvent from the viewpoint of the effect of the present invention. The oil-soluble dyes and pigments which can be appropriately used in the present invention are further described below.

—Oil-Soluble Dye—

The oil-soluble dye is not particularly limited, and can be selected from optional ones. Examples of the oil-soluble dye are listed below for each hue.

Examples of yellow dyes include aryl or heteryl-azo dyes having a phenol, a naphthol, an aniline, a pyrazolone, a pyridone, or an open-ring active methylene compound as the coupling component; azomethine dyes having an open-ring active methylene compound as the coupling component; methine dyes such as benzylidene dyes and monomethineoxonol dyes; and quinone-based dyes such as naphthoquinone dyes and anthraquinone dyes. Other examples of the dye include quinophthalone dyes, nitro and nitroso dyes, acridine dyes, and acridinon dyes.

Examples of magenta dyes include aryl or heteryl-azo dyes having a phenol, a naphthol, or an aniline as the coupling component; azomethine dyes having a pyrazolone or a pyrazolotriazole as the coupling component; methine dyes such as arylidene dyes, styryl dyes, melocyanine dyes, and oxonol dyes; carbonium dyes such as diphenylmethane dyes, triphenylmethane dyes, and xanthene dyes, quinone-based dyes such as naphthoquinone, anthraquinone, and anthrapyridone, and condensed polycyclic dyes such as dioxazine dyes.

Examples of cyan dyes include indoaniline dyes, indophenol dyes, or azomethine dyes having a pyrrolotriazole as the coupling component; polymethine dyes such as cyanine dyes, oxonol dyes, and melocyanine dyes; carbonium dyes such as diphenylmethane dyes, triphenylmethane dyes, and xanthene dyes; phthalocyanine dyes; anthraquinone dyes; aryl or heteryl-azo dyes having a phenol, a naphthol, or an aniline as the coupling component, and indigo and thioindigo dyes.

The above-described dyes may develop a yellow, magenta, or cyan color only after a portion of the color atomic group (chromophore) is dissociated. In this instance, the counter cation may be an inorganic cation such as an alkali metal or ammonium, or an organic cation such as pyridinium and a quaternary ammonium salt, and may be a polymer cation having such a cation in the substructure.

When an oil-soluble dye is used as the colorant, the content of the oil-soluble dye in the first liquid A is preferably in the range of 0.05 to 20% by mass, more preferably 0.1 to 15% by mass, and most preferably 0.2 to 6% by mass based on the mass of total solids. Furthermore, when the oil-soluble dye is contained in the second liquid B or other liquids, the content of the oil-soluble dye in each liquid is preferably in the range of 0 to 1% based on the mass of total solids.

—Pigment—

It is also a preferable embodiment that a pigment used as the colorant because mixing of a plurality of liquid tends to form aggregates. As the pigment, either organic pigments or inorganic pigments may be used. Preferable examples of black pigments include carbon black pigments. Pigments of black and three primary colors of cyan, magenta, and yellow are usually used, and other pigments having a hue of, for example, red, green, blue, brown, or white, metallic pigments such as gold and silver pigments, and colorless or light-colored extender pigments may be used according to the intended use.

Furthermore, particles such as silica, alumina, and resin particles surface-coated with a dye or a pigment, insoluble lake dyes, color emulsions, color latexes and the like may be used as the pigment. In addition, resin-coated pigments also may be used. They are called microcapsule pigments, and products of Dainippon Ink And Chemicals, Incorporated, Toyo Ink Mfg. Co., Ltd., and others are commercially available.

The volume average particle size of the pigment particles contained in the liquid is preferably in the range of 10 to 250 nm, more preferably in the range of 50 to 200 nm from the viewpoint of the balance between optical density and storage stability. The volume average particle size of the pigment particles can be measured with a measuring apparatus such as LB-500 (manufactured by Horiba, Ltd.).

When a pigment is used as the colorant, the content of the pigment in the first liquid A is preferably in the range of 0.1 to 20% by mass, and more preferably in the range of 1 to 10% by mass based on the mass of total solids from the viewpoints of optical density and ejection stability. Furthermore, when a pigment is contained in the second liquid B or other liquids, the content of the pigment in each liquid is preferably in the range of 0 to 1% by mass based on the mass of total solids.

Colorants may be used alone or in combination or two or more thereof. Furthermore, the colorants may be different or the same among jetted droplets and liquids.

In the present invention, examples of the preferable embodiment include:

(1) an embodiment in which the first liquid A contains a polymerizable material, the second liquid B contains a polymerization initiator;

(2) an embodiment in which the first liquid A contains a polymerizable material and a colorant, and the second liquid B contains a polymerization initiator; and (3) an embodiment in which the first liquid A contains a polymerizable material and a colorant, the second liquid B contains a polymerization initiator and a lipophilic solvent.

In the above-described embodiments, the polymerizable material may be contained in the first liquid A as well as in the second liquid B in the range that the effect of the present invention may not be impaired, and the polymerization initiator may be contained in the second liquid B according to the present invention, as well as in the first liquid A in the range that the effect of the present invention may not be impaired.

<Other Components>

In addition to the above-described components, known additives or the like may be added in accordance with the intended use.

—Storage Stabilizer—

Storage stabilizers may be added to the first liquid A and the second liquid B (preferably the first liquid A) according to the present invention for the purpose of inhibiting undesirable polymerization during storage. The storage stabilizers are preferably used in combination with polymerizable or crosslinkable materials, and are preferably soluble in the contained droplets or liquids, or other coexisting components.

Examples of the storage stabilizer include quaternary ammonium salts, hydroxy amines, cyclic amides, nitrites, substituted ureas, heterocycle compounds, organic acids, hydroquinone, hydroquinone monoethers, organic phosphines, and copper compounds. Specific examples thereof include benzyltrimethylammonium chloride, diethylhydroxylamine, benzothiazole, 4-amino-2,2,6,6-tetramethylpiperidine, citric acid, hydroquinone monomethyl ether, hydroquinone monobutyl ether, and copper naphthenate.

The amount of addition of the storage stabilizer is preferably adjusted on the basis of the activity of the polymerization initiator, polymerizability of the polymerizable or crosslinkable material, and the kind of the storage stabilizer, and preferably 0.005 to 1% by mass, more preferably 0.01 to 0.5% by mass, and further preferably 0.01 to 0.2% by mass on the basis of the solid content in the liquid, from the viewpoint of the balance between the storage stability and curability.

—Electro-Conductive Salts—

Electro-conductive salts are solid compounds for improving electro-conductivity. In the present invention, it is preferable not to substantially use the salts because they tend to precipitate during storage. However, they may be added in an appropriated amount when the solubility is improved by increasing the solubility of electro-conductive salts or using liquid components with high solubility.

Examples of the above-described electro-conductive salts include potassium thiocyanate, lithium nitrate, ammonium thiocyanate, and dimethylamine hydrochloride salt.

—Solvent—

In the present invention, solvents other than the above-described high-boiling solvents may be used. The solvents can be used for the purposes of improving the polarity, viscosity, and surface tension of the liquid (ink), improving the solubility and dispersibility of the coloring materials, adjusting electro-conductivity, and adjusting printing performance.

The solvents are preferably water-insoluble liquids containing no aqueous solvent for quick-drying properties and recording a high quality image having a uniform line width, thus they preferably comprise an above-described high-boiling point organic solvent.

Examples of the solvent include low-boiling organic solvents having a boiling point of 100° C. or lower, but it is preferable not use such low-boiling organic solvents because they may affect the curability and may cause environmental pollution. If a low-boiling organic solvent is used, it is preferable to use a highly safe one. Highly safe solvents are solvents for which a high control concentration (an index defined in the work environmental evaluation criteria) has been defined. The control concentration is preferably 100 ppm or higher, more preferably 200 ppm or higher. Examples of the highly safe solvents include alcohols, ketones, esters, ethers, and hydrocarbon, and specific examples thereof include methanol, 2-butanol, acetone, methylethylketone, ethyl acetate, and tetrahydrofuran.

The solvents may be used alone or in combination of two or more thereof. However, when water and/or a low-boiling organic solvent is used, the content of them in each liquid is preferably 0 to 20% by mass, more preferably 0 to 10% by mass, and most preferably substantially free. It is not preferable that the first liquid A and the second liquid B according to the present invention contain water from the viewpoints of temporal stability such as development of unevenness with time, and development of liquid turbidity due to precipitation of dyes, and drying properties on an impermeable or slowly-permeable recording medium. Substantially free means that the presence of inevitable impurities are acceptable.

—Other Additives—

Furthermore, known additives such as a polymer, a surface tension adjuster, an ultraviolet absorbing agent, an antioxidant, an antifading agent, and pH adjuster may be used.

The known surface tension adjuster, ultraviolet absorbing agent, antioxidant, antifading agent, and pH adjuster may be used as appropriate. Specific examples thereof include additives as described in JP-A No. 2001-181549.

In addition to the above-described compounds, a pair of compounds which react with each other by mixing to form an aggregate or thicken may be separately contained in the first liquid A and the second liquid B according to the present invention. The above-described pair of compounds have properties of rapidly forming an aggregate or rapidly thickening the liquid, thereby coalescence between adjacent droplets is more effectively inhibited.

Examples of the reaction between the above-described pair of compounds include an acid-base reaction, a hydrogen bond reaction between a carboxylic acid and an amide group-containing compound, a crosslinking reaction such as those between boronic acid and a diol, and a reaction by electrostatic interaction between a cation and an anion.

EXAMPLES

The present invention will be described in more detail with reference to the following examples, but the present invention is not construed as being limited thereto.

Example 1

<Preparation of Pigment Dispersion>

16 g of PB15:3 (trade name: IRGALITE BLUE GLO, manufactured by Ciba Specialty Chemicals), 48 g of 1,6-hexanediol diacrylate (trade name: HDDA, manufactured by Daicel-Cytec Company Ltd., and 16 g of BYK-168 (manufactured by BYK-Chemie) were mixed, and stirred for one hour with a stirrer. The mixture after stirring was dispersed with an Eiger mill to obtain a pigment dispersion P-1.

The dispersion was carried out for 1 hour together with zirconia beads having a diameter of 0.65 mm filled at a filling rate of 70%, and at a peripheral speed of 9 m/s.

<Preparation of Ink Jet Recording Liquid I-1 Containing Pigment>

Components of the following composition were mixed and stirred to dissolve them, thereby a ink jet recording liquid I-1 was prepared. The sp value of the ink jet recording liquid I-1 was 20.

| | | |
|---|---|---|
| The above-described pigment dispersion P-1 | | 10 g |
| DPCA 60 (polymerizable compound, manufactured by Nippon Kayaku Co., Ltd.) | | 0.54 g |
| 1,6-hexanediol diacrylate (polymerizable compound) (trade name: HDDA, manufactured by Daicel-Cytec Company Ltd.) | | 9.46 g |

The sp value was calculated using the aforementioned sp value calculation program by R. L. Smith (Tohoku University) (25° C). Hereinafter the same will employ. Compounds which don't have carbon atom were excluded from the calculation, and constitutional units such as polymer and polyethylene chains were treated as saturated repeating units having dangling bonds. Water was calculated as 47.8.

<Preparation of Liquid II-1 for Ink Jet Recording Without Pigment>

Components of the following composition were mixed and stirred to dissolve them, thereby an ink jet recording liquid II-1 was prepared. The sp value of the liquid II-1 is summarized in Table 1.

| | |
|---|---|
| High-boiling point organic solvent (aforementioned compound S-8) | 17.4 g |
| Polymerization initiator -1 (TPO-L) shown below | 2.6 g |

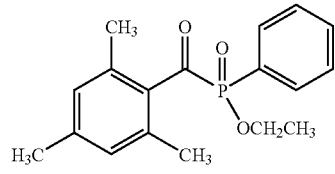

Polymerization Initiator 1

<Preparation of Liquids II-2 to II-4 for Ink Jet Recording Without Pigment>

The ink jet recording liquids II-2 to II-4 were prepared in the same manner as the above-described liquid II-1, except that the high-boiling point organic solvent (compound S-8) was replaced with each of organic solvents shown in the following Table 1. The sp value of the liquids II-1 to II-4 are summarized in Table 1.

TABLE 1

| | High-boiling point organic solvent | SP value |
|---|---|---|
| II-1 | S-8 | 18 |
| II-2 | S-15 | 20 |
| II-3 | S-25 | 19 |
| II-4 | HDDA | 20 |

<Preparation of Comparative Ink Liquid I-0 for Ink Jet Recording>

Components of the following composition were mixed and stirred to dissolve them, thereby a comparative ink jet recording liquid I-0 was prepared. The sp value of the comparative ink liquid I-0 was 19.

| | |
|---|---|
| The above-described pigment dispersion P-1 | 20 g |
| DPCA 60 (polymerizable compound, manufactured by Nippon Kayaku Co., Ltd.) | 0.54 g |

| | |
|---|---|
| High-boiling point organic solvent (aforementioned compound S-1) | 16.86 g |
| The above-described Polymerization initiator -1 (TPO-L) | 2.6 g |

<Preparation of Comparative Ink Liquid II-00>

Components of the following composition were mixed and stirred to dissolve them, thereby a comparative ink liquid II-00 was prepared. The sp value of the comparative ink liquid II-00 was 38.

| | |
|---|---|
| Glycerin | 17.4 g |
| The above-described polymerization initiator -1 (TPO-L) | 2.6 g |

<Preparation of Comparative Ink Liquid I-01>

Components of the following composition were mixed and stirred to dissolve them, thereby a comparative ink liquid I-01 was prepared. The sp value of the comparative ink liquid I-01 was 44. As the pigment was not dissolved, it was excluded from the calculation of the sp value.

Aqueous pigment dispersion

| | |
|---|---|
| PB 15:3 | 10.5 g |
| Styrene/acryl polymer (molar ratio 20/80) | 3.15 g |
| N-methylpyrrolidone | 5 g |
| Isopropylalcohol | 5 g |
| Water | 76.3 g |

<Preparation of Comparative Ink Liquid II-01>

Components of the following composition were mixed and stirred to dissolve them, thereby a comparative ink liquid II-01 was prepared. The sp value of the comparative ink liquid II-01 was 38.

| | |
|---|---|
| A-TMPT-3EO (manufactured by Shin-nakamura Chemical Co., Ltd.) | 10 g |
| Water | 60 g |
| Isopropyl alcohol | 30 g |

<Image Recording and Evaluation>

The ink jet recording liquids I-1 and II-1 prepared as described above were loaded into an ink jet printer (test model IJET 1000R2 head type, manufactured by Microjet, deposition frequency: 1 KHz, number of nozzles: 64, double array, droplet size: about 70 pl), and ejected from each of the two heads in line shape. As the recording medium, a polyethylene terephthalate (PET) sheet having a thickness of 60 μm (trade name: PPL/Xerox Film OHP FILM for laser printer, manufactured by Fuji Xerox Co., Ltd.; hereinafter referred to as PET sheet.), and art paper (trade name: Tokubishi Art Ryomen, manufactured by Mitsubishi Paper Mills Ltd.) were used.

The liquid II-1 and ink jet recording liquid I-1 were ejected at a jetting time interval of 400 m seconds. The liquid II-1 (the second liquid B) was ejected, subsequently the ink jet recording liquid I-1 (the first liquid A) was ejected so as to overlap the liquid II-1. The ejection frequency was adjusted in such a manner that the overlap ratio between the adjacent droplets of the liquid II-1 was 5%, and the overlap ratio between the adjacent droplets (the first droplet a1 and the first droplet a2) of the liquid I-1 for the ink jet recording was 50%.

Furthermore, the overlap ratio of the ink jet recording liquid I-1 was changed from 50% to 0%, and ejection was carried out in the same manner as described above.

Furthermore, the above-described jetting time interval was changed from 400 m seconds to 2 seconds, and the ink jet recording liquid I-1 was ejected in the same manner as described above at the overlap ratio of 50% and 0%.

The overlap ratio was, as aforementioned, calculated by the formula 100×(2b-c)/2b [%], wherein b is the radius of one droplet at one second after deposition, and c is the distance between the adjacent jetted droplets.

Furthermore, the liquid II-2, liquid II-3, liquid II-4, and the comparative ink solution II-00 (Comparative Example) prepared above were replaced with the above-described liquid II-1, and ejected in line form in the same manner as described above.

As Comparative Examples, the comparative ink solutions I-01 and II-01 were replaced with the ink jet recording liquids I-1 and II-1, and ejected in line shape in the same manner as described above.

Furthermore, as another Comparative Example (one-liquid type), ejection was carried out in the same manner as described above except that the comparative ink solution I-0 was replaced with the ink jet recording liquid I-1, and the liquid II-1 was not used.

After ejection, ultraviolet light was exposed by a metal halide lamp at an wavelength of 365 nm and light exposure of 500 mJ/cm$^2$, thereby recording an image. The obtained image was subjected to the following evaluations. The evaluation results are summarized in the following Tables 2 and 3. For the liquids prepared as described above, the liquids "I-" are referred to as the liquid I (the first liquid A), and the liquids "II-" are referred to as the liquid II (the second liquid B).

—1. Evaluation of Line Quality—

The liquids I and II were overlappedly jetted in line shape, and the line quality was evaluated in accordance with the following evaluation criteria. For the comparative ink solution I-0, only one kind of liquid was jetted in line shape.

<Evaluation criteria>

A: Dot shape was maintained, and uniform line shape was obtained.

A': Dot shape was not maintained, but uniform line shape was obtained.

B: Each dot lacked independence, and uneven line width was observed at some points, because of the coalescence between adjacent droplets.

C: Dots lacked independence, and uneven line width was observed all over the surface, because of the coalescence between adjacent droplets was observed all over the surface.

—2. Evaluation of Density—

The density of linear image recorded on a PET sheet was measured with a microdensitometer (trade name: MICRO-PHOTOMETER MPM-No.172, manufactured by Union Optical Co., Ltd.), and the results were evaluated according to the following evaluation criteria. The evaluation of density was carried out only for the images on PET sheets.

<Evaluation criteria>

A: Density was 2.5 or more.

B: Density was 2.0 or more and below 2.5.

C: Density was 1.5 or more and below 2.

D: Density was below 1.5.

—3. Evaluation of Stickiness—

Immediately after ultraviolet irradiation, the image surface (recorded surface) was touched with fingers, and evaluated in accordance with the following evaluation criteria.

<Evaluation criteria>

A: No stickiness.

B: Some stickiness was detected.

C: Significant stickiness was detected.

—4. Evaluation of Rubbing Resistance—

An image was formed by jetting each ink on each of a PET sheet and art paper in the above manner. When 30 minutes lapsed since the image formation, the image portion(s) of the image was rubbed with an eraser by moving the eraser back and forth ten times. The degree of image density decrease after the rubbing was determined on the basis of the following criteria.

<Evaluation criteria>

A: The image density after the rubbing is not different from that before the rubbing.

B: The difference between the image density before the rubbing and that after the rubbing is slight.

C: The difference between the image density before the rubbing and that after the rubbing is significant.

—5. Evaluation of Light Resistance—

The line images recorded on PET sheets were irradiated with xenon light (85,000 Lux) for one week using an weather meter (trade name: Atlas C.I65), and the density before and after irradiation was measured with a microdensitometer (trade name: MICRO-PHOTOMETER MPM-No.172, manufactured by Union Optical Co., Ltd.) to determine the dye residual rate [%]. The results were evaluated according to the following five-grade evaluation criteria. The evaluation of light resistance was carried out only for the image on PET sheets.

<Evaluation criteria>

A: The colorant remaining rate was 90% or more.

B: The colorant remaining rate was 89 to 80%.

C: The colorant remaining rate was 79 to 70%.

D: The colorant remaining rate was 69 to 50%.

E: The colorant remaining rate was less than 49%.

—6. Evaluation of Ozone Resistance—

The line images recorded on PET sheets were stored for one week at a ozone density of 5.0 ppm, and the image density before and after the storage was measured with a microdensitometer (trade name: MICRO-PHOTOMETER MPM-No. 172, manufactured by Union Optical Co., Ltd.) to determine the dye residual rate [%]. The results were evaluated according to the following five-grade evaluation criteria. The evaluation of ozone resistance was carried out only for the images on PET sheets.

<Evaluation criteria>

A: Dye residual rate was 90% or more.

B: Dye residual rate was 89 to 80%.

C: Dye residual rate was 79 to 70%.

D: Dye residual rate was 69 to 50%.

E: Dye residual rate was less than 49%.

TABLE 2

| | Jetting time Interval between two Liquids | Overlap Ratio | Recording Medium | Line Quality | Density | Stickiness | Rubbing Resistance | Light Resistance | Ozone Resistance | Remark |
|---|---|---|---|---|---|---|---|---|---|---|
| II-1 ⇒ I-1 | 400 ms | 50% | PET | A | A | A | A | A | A | The present invention |
| II-1 ⇒ I-1 | 400 ms | 50% | Art paper | A | — | A | A | — | — | The present invention |
| II-2 ⇒ I-1 | 400 ms | 50% | PET | A | A | A | A | A | A | The present invention |
| II-2 ⇒ I-1 | 400 ms | 50% | Art paper | A | — | A | A | — | — | The present invention |
| II-3 ⇒ I-1 | 400 ms | 50% | PET | A | A | A | A | A | A | The present invention |
| II-3 ⇒ I-1 | 400 ms | 50% | Art paper | A | — | A | A | — | — | The present invention |
| II-4 ⇒ I-1 | 400 ms | 50% | PET | A | A | A | A | A | A | The present invention |
| II-4 ⇒ I-1 | 400 ms | 50% | Art paper | A | — | A | A | — | — | The present invention |
| I-0 | 400 ms | 50% | PET | C | A | A | A | A | A | Comparative example |
| I-0 | 400 ms | 50% | Art paper | C | — | A | A | — | — | Comparative example |
| II-00 ⇒ I-1 | 400 ms | 50% | PET | C | C | C | C | A | A | Comparative example |
| II-00 ⇒ I-1 | 400 ms | 50% | Art paper | C | — | C | C | — | — | Comparative example |
| II-01 ⇒ I-01 | 400 ms | 50% | PET | C | A | C | C | A | A | Comparative example |
| II-01 ⇒ I-01 | 400 ms | 50% | Art paper | C | — | C | C | — | — | Comparative example |
| II-1 ⇒ I-1 | 400 ms | 0% | PET | A | C | A | A | A | A | Comparative example |
| II-1 ⇒ I-1 | 400 ms | 0% | Art paper | A | — | A | A | — | — | Comparative example |
| II-2 ⇒ I-1 | 400 ms | 0% | PET | A | C | A | A | A | A | Comparative example |
| II-2 ⇒ I-1 | 400 ms | 0% | Art paper | A | — | A | A | — | — | Comparative example |
| II-3 ⇒ I-1 | 400 ms | 0% | PET | A | C | A | A | A | A | Comparative example |
| II-3 ⇒ I-1 | 400 ms | 0% | Art paper | A | — | A | A | — | — | Comparative example |
| II-4 ⇒ I-1 | 400 ms | 0% | PET | A | C | A | A | A | A | Comparative example |
| II-4 ⇒ I-1 | 400 ms | 0% | Art paper | A | — | A | A | — | — | Comparative example |
| I-0 | 400 ms | 0% | PET | A' | C | A | A | A | A | Comparative example |
| I-0 | 400 ms | 0% | Art paper | A' | — | A | A | — | — | Comparative example |
| II-00 ⇒ I-1 | 400 ms | 0% | PET | C | D | C | C | A | A | Comparative example |
| II-00 ⇒ I-1 | 400 ms | 0% | Art paper | B | — | C | C | — | — | Comparative example |
| II-01 ⇒ I-01 | 400 ms | 0% | PET | C | C | C | C | A | A | Comparative example |
| II-01 ⇒ I-01 | 400 ms | 0% | Art paper | C | — | C | C | — | — | Comparative example |

TABLE 3

| | Jetting time Interval between two Liquids | Overlap Ratio | Recording Medium | Line Quality | Density | Stickiness | Rubbing Resistance | Light Resistance | Ozone Resistance | Remark |
|---|---|---|---|---|---|---|---|---|---|---|
| II-1 ⇒ I-1 | 2 s | 50% | PET | A | A | A | A | A | A | The present invention |
| II-1 ⇒ I-1 | 2 s | 50% | Art paper | B | — | A | A | — | — | The present invention |
| II-2 ⇒ I-1 | 2 s | 50% | PET | A | A | A | A | A | A | The present invention |
| II-2 ⇒ I-1 | 2 s | 50% | Art paper | B | — | A | A | — | — | The present invention |
| II-3 ⇒ I-1 | 2 s | 50% | PET | A | A | A | A | A | A | The present invention |
| II-3 ⇒ I-1 | 2 s | 50% | Art paper | B | — | A | A | — | — | The present invention |
| II-4 ⇒ I-1 | 2 s | 50% | PET | A | A | A | A | A | A | The present invention |
| II-4 ⇒ I-1 | 2 s | 50% | Art paper | B | — | A | A | — | — | The present invention |
| I-0 | 2 s | 50% | PET | C | A | A | A | A | A | Comparative example |
| I-0 | 2 s | 50% | Art paper | C | — | A | A | — | — | Comparative example |
| II-00 ⇒ I-1 | 2 s | 50% | PET | C | C | C | C | A | A | Comparative example |
| II-00 ⇒ I-1 | 2 s | 50% | Art paper | C | — | C | C | — | — | Comparative example |
| II-01 ⇒ I-01 | 2 s | 50% | PET | C | A | C | C | A | A | Comparative example |
| II-01 ⇒ I-01 | 2 s | 50% | Art paper | C | — | C | C | — | — | Comparative example |
| II-1 ⇒ I-1 | 2 s | 0% | PET | A | C | A | A | A | A | Comparative example |
| II-1 ⇒ I-1 | 2 s | 0% | Art paper | A | — | A | A | — | — | Comparative example |
| II-2 ⇒ I-1 | 2 s | 0% | PET | A | C | A | A | A | A | Comparative example |
| II-2 ⇒ I-1 | 2 s | 0% | Art paper | A | — | A | A | — | — | Comparative example |
| II-3 ⇒ I-1 | 2 s | 0% | PET | A | C | A | A | A | A | Comparative example |
| II-3 ⇒ I-1 | 2 s | 0% | Art paper | A | — | A | A | — | — | Comparative example |
| II-4 ⇒ I-1 | 2 s | 0% | PET | A | C | A | A | A | A | Comparative example |
| II-4 ⇒ I-1 | 2 s | 0% | Art paper | A | — | A | A | — | — | Comparative example |
| I-0 | 2 s | 0% | PET | A' | C | A | A | A | A | Comparative example |
| I-0 | 2 s | 0% | Art paper | A' | — | A | A | — | — | Comparative example |
| II-00 ⇒ I-1 | 2 s | 0% | PET | C | D | C | C | A | A | Comparative example |
| II-00 ⇒ I-1 | 2 s | 0% | Art paper | C | — | C | C | — | — | Comparative example |
| II-01 ⇒ I-01 | 2 s | 0% | PET | A | C | A | A | A | A | Comparative example |
| II-01 ⇒ I-01 | 2 s | 0% | Art paper | A | — | A | A | — | — | Comparative example |

In the Tables 1 and 2, when II-4 was used, the ejectability was deteriorated to some extent in a repeated test. In the evaluation of the Tables 1 and 2, "-" means that evaluation wasn't subjected.

In the embodiment, as shown in the above Tables 2 and 3, coalescence between the droplets which had been overlappedly jetted in contact with each other was prevented, thereby a sharp line image with a maintained dot shape was obtained at a high density.

On the other hand, in Comparative Example of a one-liquid system using the comparative ink I-0, higher overlap ratios resulted in deteriorated line quality, and the decrease in the overlap ratio resulted in some equalization of the line quality to some extent though the dot shape was not maintained. However, a high density image was not obtained.

In Comparative Examples using the comparative ink solutions II-01 (water-based) and II-00, which had a sp value out of the range of the embodiment, the line quality was inferior, and the stickiness and rubbing resistance were also inferior. In case of the combination of I-1 and II-0 whose the sp values were significantly different from each other and out of the range of the embodiment, the decrease in the density presumably due to the collapse of dispersed pigments, and the deterioration of the film quality presumably due to the poor dispersion of the polymerization initiator were observed. Accordingly, it was impossible to form an image with a good line quality and a high density.

Furthermore, when the jetting time interval was 400 m seconds, image recording with a better line quality was achieved specifically on art paper, in comparison with the instance where the jetting time interval was reduced to 2 seconds.

When the liquid I-0 remained in an ink jet head for one day, clogging of the nozzle was observed.

Example 2

An experimental apparatus equipped with a CB1 head (manufactured by Toshiba Tech Corporation, number of nozzles: 318, density of nozzles: 150 npi, drop size: 6 pl, driving frequency: 4.8 kHz) was replaced with the ink jet printer in Example 1, and a line-form image was formed using the apparatus in the same manner as Example 1. As a result, a thin line of independent dots was formed.

The foregoing description of the embodiments of the present invention has been provided for the purposes of illustration and description. It is not intended to be exhaustive or to limit the invention to the precise forms disclosed. Obviously, many modifications and variations will be apps rent to practitioners skilled in the art. The embodiments were chosen and described in order to best explain the principles of the invention and its practical applications, thereby enabling others skilled in the art to understand the invention for various embodiments and with the various modification s as are suited to the particular use contemplated. It is intended that the scope of the invention be defined by the following claims and their equivalents. All publications, patent applications, and technical standards mentioned in this specification are herein incorporated by reference to the same extent as if each individual publication, patent application, or technical standard was specifically and individually indicated to be incorporated by reference.

What is claimed is:

1. An ink jet recording method for recording an image on a recording medium using a first liquid A for forming the image containing a polymerizable or crosslinkable material, and a second liquid B having a different composition from the composition of the first liquid A, the method comprising:
   applying the second liquid B onto the same area at which the image is to be formed by the first liquid A or a wider area than the area at which the image is to be formed by the first liquid A, of the recording medium which is impermeable or slowly-permeable; and
   jetting the first liquid A onto the recording medium where the second liquid B has been applied so that at least a droplet a1 and a droplet a2 of the first liquid A have an overlap portion,
   wherein the liquid B has a solubility parameter value of 35 or less and the difference of the solubility parameter value of the liquid B and the solubility parameter value of the liquid A is 10 or less;
   wherein the liquid B contains a lipophilic solvent in an amount of 50% by mass or more based on the total mass of the liquid B, said lipophilic solvent being an organic solvent having a boiling point higher than 100° C.; and
   wherein the liquid A and liquid B each have a viscosity at 25° C. in the range of 5 to 100 mPa·s.

2. The ink jet recording method according to claim 1, wherein the solubility parameter value of the second liquid B is 30 or less.

3. The ink jet recording method according to claim 1, wherein an overlap ratio at the overlap portion is in the range of 10% to 90%.

4. The ink jet recording method according to claim 1, wherein the second liquid B farther contains a polymerization initiator.

5. The ink jet recording method according to claim 1, wherein the first liquid A further contains a colorant.

6. The ink jet recording method according to claim 1, wherein a time interval between the finishing point of the application of the second liquid B and the staffing point of the jetting of the droplet a1 is in the range of 5 µ seconds to 400 m seconds.

7. The ink jet recording method according to claim 1, wherein the average volume of the droplet a1 and droplet a2 of the first liquid A is 0.1 picoliter to 100 picoliters.

8. The ink jet recording method according to claim 1, wherein the polymerizable material is polymerized or the crosslinkable material is crosslinked by applying activation energy after jetting the droplets of the first liquid A.

9. The ink jet recording method according to claim 1, wherein the solubility parameter value of the second liquid B is 25 or less.

10. The ink jet recording method according to claim 1, wherein the difference between the solubility parameter value of the first liquid A and the solubility parameter value of the second liquid B is 5 or less.

11. The ink jet recording method according to claim 3, wherein the overlap ratio at the overlap portion is 30% to 70%.

12. The ink jet recording method according to claim 8, wherein the activation energy is applied by irradiation of ultraviolet rays.

13. The ink jet recording method according to claim 1, wherein the content of the lipophilic solvent is 50% by mass to 100% by mass based on the total mass of the liquid B.

14. The ink jet recording method according to claim 4, wherein the second liquid B contains the polymerization initiator so that the content of the polymerization initiator is in the range of 0.5 to 20% by mass based on the amount of the polymerizable or crosslinkable material per unit area.

15. The ink jet recording method according to claim 1, wherein the mass ratio of the second liquid B applied per droplet of the droplets a1 and a2 is in the range of 0.05 to 5 based on the mass of one droplet of the droplets a1 and a2.

16. The ink jet recording method according to claim 1, wherein the mass ratio of the second liquid B applied per droplet of the droplets a1 and a2 is in the range of 0.1 to 1 based on the mass of one droplet of the droplets a1 and a2.

17. The ink jet recording method according to claim 1, wherein the content of the polymerizable or crosslinkable material in the first liquid A is in the range of 50 to 99.6% by mass based on the mass of the total solids in the first liquid A.

18. The ink jet recording method according to claim 1, wherein the content of the polymerizable or crosslinikable material in the first liquid A is in the range of 80 to 99.0% by mass based on the mass of the total solids in the first liquid A.

* * * * *